United States Patent
Miller et al.

(10) Patent No.: US 9,465,405 B1
(45) Date of Patent: Oct. 11, 2016

(54) SYNCHRONOUS COMMUNICATION BETWEEN SYSTEM IN PACKAGE (SIP) DEVICES

(71) Applicant: FREESCALE SEMICONDUCTOR, INC., Austin, TX (US)

(72) Inventors: Gary L. Miller, Austin, TX (US); David D. Barrera, Austin, TX (US); Michael E. Gladden, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 0 days.

(21) Appl. No.: 14/788,363

(22) Filed: Jun. 30, 2015

(51) Int. Cl.
*H03D 3/24* (2006.01)
*G06F 1/12* (2006.01)
*G06F 13/36* (2006.01)

(52) U.S. Cl.
CPC ............. *G06F 1/12* (2013.01); *G06F 13/36* (2013.01)

(58) Field of Classification Search
CPC .......... G06F 1/12; G06F 13/36; H03L 7/00; H03L 7/06
USPC .................. 375/373, 375, 354; 327/142, 158
See application file for complete search history.

(56) References Cited

U.S. PATENT DOCUMENTS

| | | | |
|---|---|---|---|
| 2007/0030030 A1* | 2/2007 | Waldrop | G11C 7/1045 326/93 |
| 2009/0222707 A1* | 9/2009 | Shin | G06F 11/1004 714/758 |
| 2011/0058442 A1* | 3/2011 | Fujisawa | G11C 5/063 365/233.1 |
| 2011/0187427 A1* | 8/2011 | Kim | H03L 7/06 327/158 |
| 2013/0043904 A1* | 2/2013 | Ivory | H03K 5/135 326/93 |
| 2013/0113531 A1* | 5/2013 | Luedeke | H03L 7/00 327/142 |
| 2013/0195235 A1 | 8/2013 | Ferris et al. | |

* cited by examiner

*Primary Examiner* — Phuong Phu

(57) ABSTRACT

A source clock signal is received from a primary semiconductor device by a secondary semiconductor device via an interconnect. A local clock signal is generated on the secondary semiconductor device based on the source clock signal. A mode control signal is generated on the secondary semiconductor device, where the mode control signal indicates one of an unlock mode of operation and a lock mode of operation of the secondary semiconductor device. A physical interface (PHY) clock signal is generated based on the local clock signal, where the PHY clock signal includes the local clock signal during the lock mode, and the PHY clock signal includes an inverted version of the local clock signal during the unlock mode. Data received from the primary semiconductor device via the interconnect is latched at a positive edge of the PHY clock signal during the unlock mode and the lock mode.

20 Claims, 8 Drawing Sheets

SYNCHRONOUS COMMUNICATION BETWEEN SYSTEM IN PACKAGE (SIP) DEVICES

BACKGROUND

1. Field

This disclosure relates generally to system-in-package (SiP) devices, and more specifically, to achieving synchronous communication across integrated circuits within SiP devices.

2. Related Art

System-in-package (SiP) technology currently attempts to interconnect numerous semiconductor devices within a single semiconductor package. SiP technology includes various interconnect techniques, such as utilizing copper pillar interconnects, flip-chip interconnects, interconnect fabric, and the like.

BRIEF DESCRIPTION OF THE DRAWINGS

The present invention may be better understood, and its numerous objects, features, and advantages made apparent to those skilled in the art by referencing the accompanying drawings.

The present invention is illustrated by way of example and is not limited by the accompanying figures, in which like references indicate similar elements, unless otherwise noted. Elements in the figures are illustrated for simplicity and clarity and have not necessarily been drawn to scale.

DETAILED DESCRIPTION

Figure 1:
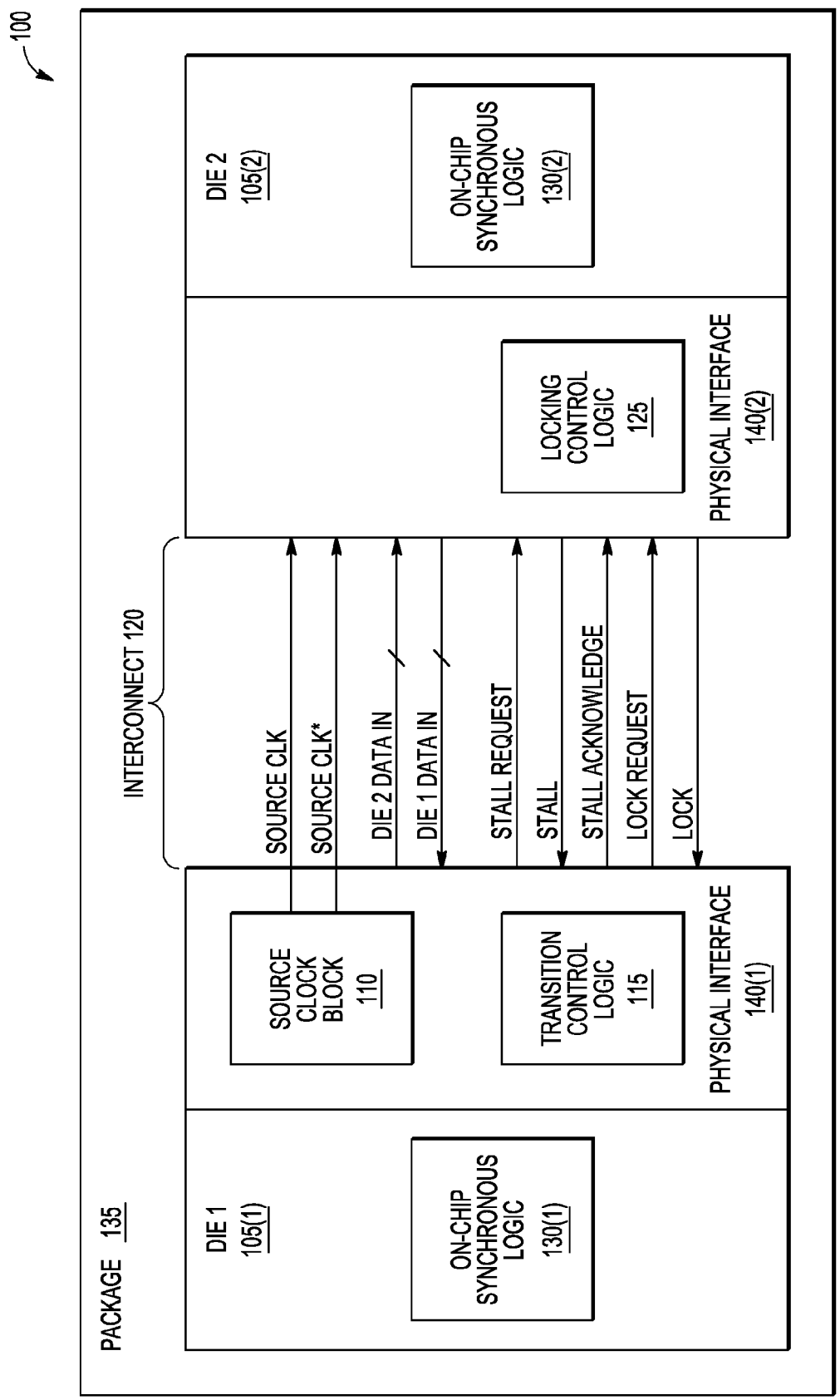
FIG. 1 illustrates a block diagram depicting example communication via interconnect circuitry between primary and secondary semiconductor devices in which the present disclosure is implemented, according to some embodiments.

The following sets forth a detailed description of various embodiments intended to be illustrative of the invention and should not be taken to be limiting.

Overview

An integrated circuit often includes synchronous elements, or elements that must be synchronized using a clock signal. As the clock signal is distributed to the elements in the integrated circuit via a clock distribution network, the clock signal may arrive at the elements at different times due to various factors affecting the clock signal, such as differing path length to the elements, temperature variation, electromagnetic interference, resistive-capacitive coupling, propagation delays of buffers used in the clock distribution network, and the like. In order for the integrated circuit to operate properly, such clock skew must be reduced by balancing the clock signal across the integrated circuit to ensure that the synchronous elements receive logic level changes of the clock signal simultaneously.

System-in-package (SiP) technology currently attempts to interconnect numerous different types of semiconductor devices (or SiP devices) within a single semiconductor package (or SiP package). The integrated circuits of the different SiP devices also include synchronous elements. Many high performance applications require synchronous communication within an SiP package, where the various synchronous elements of the SiP devices must be synchronized. Present solutions often utilize clock domain crossing logic within interfacing logic on each interconnected interface of the SiP devices. However, clock domain crossing can cause significant latency penalties for high performance applications as signals cross from one clock domain to another clock domain.

Conventionally, DLL (delay-locked loop) circuitry has been implemented on secondary devices of an SiP package to lock to a clock signal received from a master device of the SiP. However, one limitation of this conventional solution is that DLL circuitry technology does not operate properly at low frequencies. For example, a DLL that includes a large number of delay elements of 25 picoseconds per element will only operate down to 300 MHz. This is a severe operational restriction on the vast majority of SiP start-up conditions, which is simply unacceptable for many high performance applications.

The present disclosure provides for synchronous data communication between synchronous logic partitioned onto two devices, even when conventional clock synchronizing components are non-operational. A source clock signal is provided by a host device to one or more secondary or expansion devices of a SiP package. Two modes of device operation are discussed herein: an unlocked mode and a locked mode (also referred to as an unlock mode and a lock mode). During unlocked mode, the source clock signal on the host device is not phase aligned (e.g., is not locked) with the clock signals on the secondary device. Data is driven from the host device to the secondary device on the positive edge of the source clock signal, while the data is latched on the negative edge of the source clock signal on the secondary device during unlocked mode. In some embodiments, the source clock signal has a low clock frequency, such as a frequency less than 300 MHz, during unlocked mode. In other embodiments, the source clock signal utilizes a clock frequency other than a low clock frequency, such as above 300 MHz, during unlocked mode. The source clock signal experiences delay as it traverses interconnect circuitry between the host and secondary devices, as well as clock insertion delay arising from clock generation circuitry and clock distribution network on the secondary device. In some embodiments, the clock frequency of the source clock signal is selected to ensure that the delay experienced by the source clock signal is less than half of the period of the source clock signal.

During locked mode, the source clock signal on the host device is phase aligned (e.g., is locked) with the received source clock signal on the secondary device, where clock alignment circuitry on the secondary device compensates for the delay experienced by the source clock signal as it reaches the secondary device. Data is driven from the host device to the secondary device on the positive edge of the source clock signal, and the data is latched on the positive edge of the source clock signal on the secondary device during locked mode. In some embodiments, the source clock signal has a high clock frequency, such as a frequency within a range of 300 MHz to over 1 GHz, during locked mode. In other embodiments, the source clock signal utilizes a clock frequency other than a high clock frequency, such as a frequency less than 300 MHZ.

In some embodiments, the host device and the secondary device each have a PLL that are not enabled (and thus not locked) during unlocked mode, such as upon startup (or other condition that requires unlocked mode operation) of the SiP that includes the host device and the secondary device. After startup, the PLLs are then enabled and locked to transition the host device and the secondary device to locked mode. In this manner, the present disclosure provides a flexible and low latency solution for synchronous data communication between two die within a single phase clock domain interface without any clock domain crossings, thus avoiding latency and performance penalties.

Example Embodiments

FIG. 1 illustrates a simplified block diagram depicting example communication via interconnect circuitry between primary and secondary semiconductor devices, such as between die 1 105(1) and die 2 105(2), of a system 100 in which the present disclosure is implemented. In some embodiments, die 1 is a host device and die 2 is an expansion device configured to be in synchronous communication with die 1 as part of a system-in-package (SiP) package 135. While both die 1 and die 2 include a great variety of components, many components are omitted in FIG. 1 to maintain simplicity.

Die 1 includes on-chip synchronous logic 130(1) and die 2 includes on-chip synchronous logic 130(2), where on-chip synchronous logic 130(1) and 130(2) are configured to exchange data with one another via interconnect 120. On-chip synchronous logic 130(1) includes synchronous elements that are configured to be in synchronous communication with synchronous elements of on-chip synchronous logic 130(2). An example embodiment of on-chip synchronous logic 130(1) and 130(2) includes a synchronous bus that is configured to be in synchronous communication across die 1 and die 2.

Die 1 includes physical interface 140(1) and die 2 includes physical interface 140(2). Physical interface 140(1) and 140(2) each include interconnect circuitry configured to enable communication between die 1 and die 2, where physical interfaces 140(1) and 140(2) are connected via interconnect 120. Examples of interconnect 120 include but are not limited to any one of various interconnect technologies, such as copper pillar interconnect technology (e.g., for stacked devices), flip-chip interconnect technology (e.g., for flip-chip devices), interconnect fabric (e.g., for some types of SiP devices), and the like.

Interconnect circuitry of physical interfaces 140(1) and 140(2) each include a set of transmit data registers (e.g., synchronous elements, such as flip flops) for storing data to be transmitted on interconnect 120 and a set of receipt data registers for storing data that is received from interconnect 120. The transmit and receipt data registers of physical interface 140(1) are coupled to internal circuitry of die 1, such as on-chip synchronous logic 130(1) that provides data to be transmitted to die 2 or receives data received from die 2. Similarly, the transmit and receipt data registers of physical interface 140(2) are coupled to internal circuitry of die 2, such as on-chip synchronous logic 130(2) that provides data to be transmitted to die 1 or receives data received from die 1. Die 1's set of transmit data registers are coupled to die 2's set of receipt data registers via a set of data lines, illustrated as Die 2 Data In data lines (e.g., data lines for transmitting data from die 1 to die 2). Die 2's set of transmit data registers are coupled to die 1's set of receipt data registers via another set of data lines, illustrated as Die 1 Data In data lines (e.g., data lines for transmitting data from die 2 to die 1).

In some embodiments, interconnect circuitry implements time-division multiplexing (TDM) in order to transmit and receive alternating data of two or more independent data signals over a common channel (e.g., data of multiple data signals is transmitted and received over Die 2 Data In and Die 1 Data In data lines). A TDM implementation of the present disclosure is further discussed below in connection with FIG. 3. Also, in the embodiments discussed herein, interconnect circuitry includes technology translation circuitry, such as level shift circuitry that allows die of different technologies to communicate with one another. As such, die 1 and die 2 are agnostic as to each other's die type.

Die 1 also includes a source clock block 110 implemented on physical interface 140(1). Source clock block 110 is configured to provide one or more clock signals, including a synchronous source clock signal (illustrated as Source CLK). In some embodiments, the one or more clock signals also includes a faster synchronous source clock signal denoted by an asterisk (illustrated as Source CLK*), to die 2. Source CLK* is a clock signal that has a frequency that is some factor (e.g., multiple) faster than the frequency of Source CLK. In the embodiments discussed herein, Source CLK* has a frequency that is twice as fast as Source CLK, although other frequencies of Source CLK* may be implemented (e.g., four times as fast). Source clock block 110 includes clock generation circuitry to generate one or more clock signals, including Source CLK and Source CLK*, and a clock distribution network that distributes clock signals on die 1, including distributing Source CLK and Source CLK* to interconnect 120. Die 2 includes a clock alignment block (further discussed below) that includes clock generation circuitry and a clock distribution network. Die 1 also includes clock alignment control circuitry configured to enable (e.g., during locked mode) or disable (e.g., during unlocked mode) the clock alignment block on die 2. When enabled, the clock alignment block on die 2 is configured to align the clock signals on die 2 (e.g., utilizing a delay-locked loop (DLL), a phase-locked loop (PLL), and the like) to compensate for any delay introduced into the clock signals (e.g., delay arising from traversing the interconnect circuitry between die 1 and die 2, from the clock generation circuitry, and from the clock distribution network).

Die 1 includes transition control logic 115 implemented on physical interface 140(1) and die 2 includes locking control logic 125 implemented on physical interface 140(2). In some embodiments, transition control logic 115 and locking control logic 125 are implemented, at least in part, as software that includes a sequence of operations designed for execution by processor circuitry respectively implemented on die 1 and die 2. In some embodiments, transition control logic 115 and locking control logic 125 are implemented, at least in part, as hardware that implements a sequence of operations. Transition control logic 115 is configured to operate hardware such as transmit and receipt data registers on physical interface 140(1), and locking control logic 125 is configured to operate hardware such as transmit and receipt registers on physical interface 140(2).

Transition control logic 115 and locking control logic 125 are configured to implement two modes of synchronous data communication between die 1 and die 2: an unlocked mode and a locked mode. During unlocked and locked modes, Source CLK is utilized on die 1 to operate transmit and receipt data registers on physical interface 140(1), while a physical interface clock signal (also referred to as PHY CLK, further discussed below in connection with FIG. 4) generated on die 2 is utilized to operate transmit and receipt data registers on physical interface 140(2). Unlocked mode provides that Source CLK and PHY CLK are not phase aligned with one another (e.g., a positive clock edge of PHY CLK follows a positive clock edge of Source CLK by some delay, such as one or more nanoseconds). In some embodiments, unlocked mode also provides that Source CLK and PHY CLK utilize a low clock frequency (e.g., a frequency within a range of 0 Hz up to 300 Mhz). Also during unlocked mode, a negative edge of Source CLK is utilized on die 2 to ensure that hold time issues (which may arise due to clock insertion delay on die 2) are avoided, as further discussed below. During unlocked mode, data is driven from die 1 to die 2 on a positive edge of Source CLK, and data is latched in receipt registers on die 2 on a negative edge of the (received) Source CLK. Data is driven from die 2 to die 1 on a positive edge of (received) Source CLK, and data is latched in receipt registers of die 1 on a positive edge of Source CLK.

Locked mode provides that Source CLK and PHY CLK utilize a typical clock frequency (e.g., a frequency within a range of 300 Mhz up to several Ghz) and are phase aligned with one another (e.g., a positive clock edge of PHY CLK is aligned with a positive clock edge of Source CLK within +/−100 picoseconds). During locked mode, data is driven from die 1 to die 2 on a positive edge of Source CLK, and data is latched in receipt registers on die 2 on a positive edge of the (received) Source CLK that is aligned with Source CLK. Data continues to be driven from die 2 to die 1 on a positive edge of (received) Source CLK, and data is latched in receipt registers of die 1 on a positive edge of Source CLK.

Transition control logic 115 and locking control logic 125 implement unlocked mode of communication on die 1 and die 2 typically upon start up (e.g., unlocked mode is the default start up mode of communication between die 1 and die 2). Transition control logic 115 is configured to initiate a transition process from unlocked mode to locked mode, where transition control logic 115 and locking control logic 125 communicate with one another during the transition process by asserting and clearing a set of signals that include a stall request signal, a stall signal, a stall acknowledge signal, a lock request signal, and a lock signal. The direction of each such set of signals is illustrated in FIG. 1. The transition process from unlocked mode to locked mode is further discussed below in connection with FIG. 5. Operation of the interconnect circuitry of physical interface 140(2) during unlocked mode and locked mode is further discussed below in connection with FIGS. 2 and 3.

Figure 2:
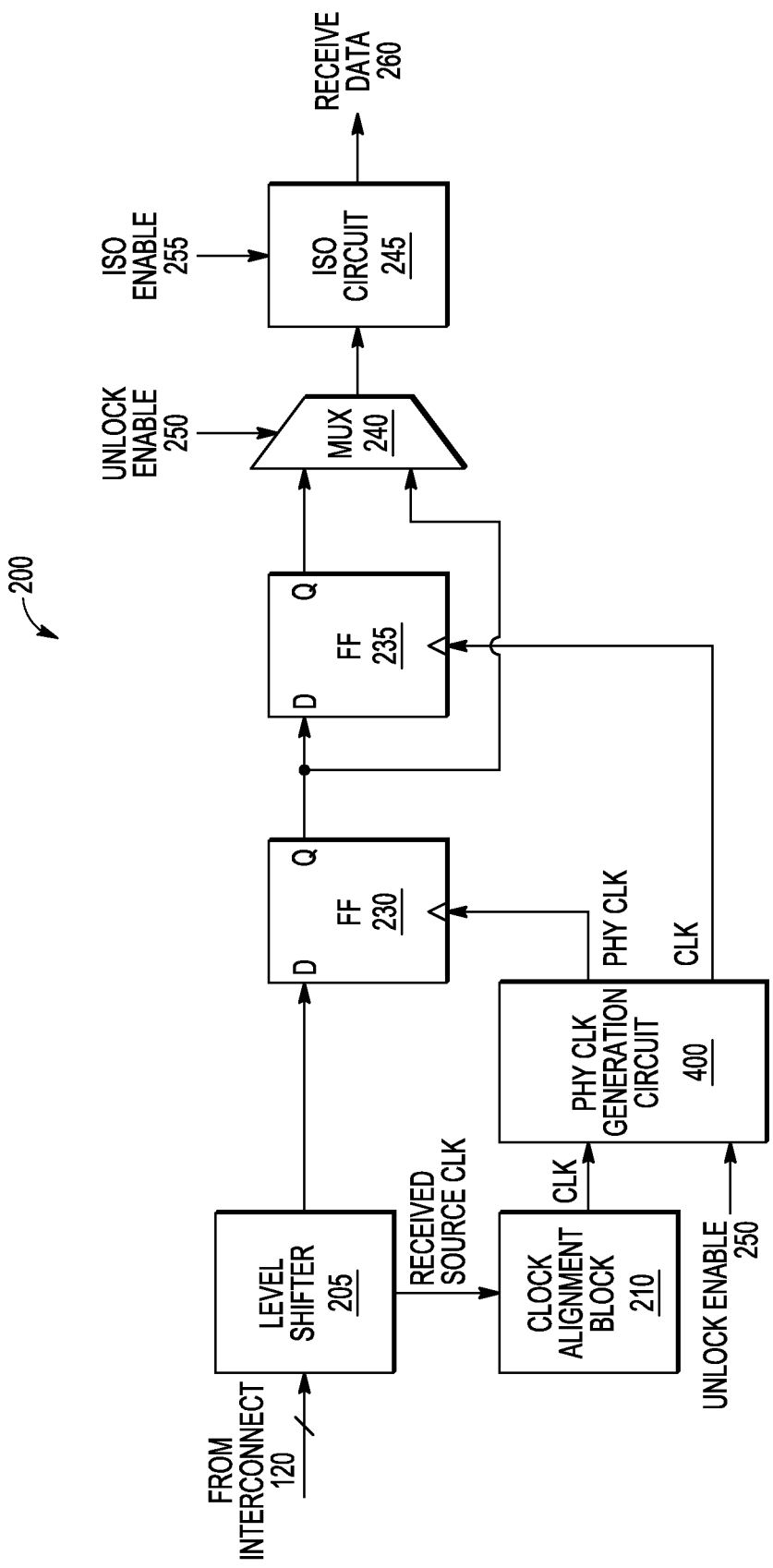
FIG. 2-3 illustrate example interconnect circuitry and locking control logic implemented on a physical interface of a secondary semiconductor device, according to some embodiments of the present disclosure.

FIG. 2 illustrates an embodiment of interconnect circuitry 200 and locking control logic 125 implemented on a physical interface of a secondary semiconductor device, such as die 2 105(2). In the embodiment illustrated, interconnect circuitry 200 of physical interface 140(2) includes a level shifter 205, clock alignment block 210, flip flop (FF) 230, FF 235, multiplexer 240, isolation circuit 245, and physical interface clock signal (PHY CLK) generation circuit 400. Locking control logic 125 is configured to control the interconnect circuitry to operate in either unlocked mode or in locked mode, as further discussed below.

In the embodiment illustrated, signals received from a primary semiconductor device, such as die 1 105(1), via interconnect 120 are routed to a level shifter 205 of interconnect circuitry. While a single level shifter 205 is illustrated for ease of simplicity, level shifter 205 represents a number of level shifters, one for each signal of interconnect 120. Level shifter 205 includes technology translation circuitry that is configured to adjust signals received from a die (such as die 1) to a level utilized by internal circuitry of die 2. The signals received from die 1 include a clock signal, Source CLK. In the embodiment illustrated, level shifter 205 provides a level-shifted version of the Source CLK (illustrated as Received Source CLK) to clock alignment block 210 as an input clock signal. The signals received from die 1 also include a data signal, where level shifter 205 provides a level-shifted version of the data signal to FF 230.

In other embodiments, level shifter 205 is not included in interconnect circuitry of physical interface 140(2) (e.g., level shifter may instead be included in interconnect circuitry of physical interface 140(1) of die 1, or level shifter may not be present on either die 1 or die 2). In such embodiments, the data signal and Source CLK signal received via interconnect 120 are instead respectively routed to FF 230 and clock alignment block 210.

Clock alignment block 210 includes clock generation circuitry to utilize the input Received Source CLK signal to generate one or more clock signals including a local clock signal CLK. Clock alignment block 210 also includes a clock distribution network that distributes a number of clock signals to synchronous elements on die 2. During unlocked mode, clock alignment block 210 does not phase align CLK on die 2 with Source CLK on die 1, where a positive edge of CLK is delayed from a positive edge of Source CLK by some total delay (e.g., several nanoseconds). Such total delay includes, but is not limited to, interconnect delay arising from traversing interconnect circuitry on die 1 and die 2, delay arising from traversing level shifter 205, and clock insertion delay arising from clock generation circuitry and clock distribution network on die 2. During locked mode, clock alignment block 210 phase aligns CLK on die 2 with Source CLK on die 1, where a positive edge of CLK is aligned with a positive edge of Source CLK within some minimal range of delay (e.g., within 100 picoseconds). Examples of circuitry included in clock alignment block 210 include but are not limited to a delay-locked loop (DLL), a phase-locked loop (PLL), and similar circuitry configured to generate an adjustable periodic clock signal.

PHY CLK generation circuit 400 receives CLK and unlock enable signal 250. PHY CLK generation circuit 400 is configured to generate PHY CLK based on CLK during the unlocked and locked modes, as indicated by unlock enable signal 250 that is generated by locking control logic 125. In the embodiment of FIG. 2, a non-inverted version of CLK is utilized as PHY CLK during locked mode and an inverted version of CLK is utilized as PHY CLK during unlocked mode, where the clock frequency of PHY CLK is substantially equal to the clock frequency of CLK during both modes. In another embodiment (such as that discussed below in connection with FIG. 3), PHY CLK has a clock frequency that is a factor faster than CLK (e.g., twice as fast). In both illustrated embodiments, CLK (which is generated based on Received Source CLK) has a low clock frequency (e.g., less than 300 MHz) during unlocked mode and has a high frequency (e.g., equal to or greater than 300 MHz) during locked mode. PHY CLK generation circuit 400 provides PHY CLK to clock input of FF 230 and provides CLK to clock input of FF 235.

Level shifter 205 outputs data of the received data signal to FF 230, which in turn outputs data to FF 235. In the embodiment of FIG. 2, FF 230 latches data on the negative edge of CLK during unlocked mode and latches data on the positive edge of CLK during locked mode. To achieve this triggering scheme, FF230 is clocked by PHY CLK and is triggered to store data on the positive edge of PHY CLK in both unlocked and locked modes, where the positive edge of PHY CLK is aligned with the negative edge of CLK during unlocked mode and where the positive edge of PHY CLK is aligned with the positive edge of CLK during locked mode. FF 235 latches data on the positive edge of CLK during both unlocked mode and locked mode. As further discussed below, FF 235 stages the data to be synchronous to on-chip synchronous logic 130(2) during unlocked mode. PHY CLK generation circuit 400 is further discussed below in connection with FIG. 4.

The data of the received data signal must be held steady at FF 230 for a minimum amount of time before a triggering clock edge of PHY CLK (e.g., positive edge) to satisfy setup time requirements of FF 230, and must also be held steady at FF 230 for a minimum amount of time after the triggering clock edge of PHY CLK to satisfy hold time requirements of FF 230. When setup and hold times are met, FF 230 successfully stores and outputs the data provided by level shifter 205 on a given clock cycle of PHY CLK (e.g., a cycle measured from triggering edge to triggering edge). Due to clock insertion delay experienced on die 2 (since PHY CLK and CLK are not phase aligned with Source CLK), the positive edges of PHY CLK lose alignment with the data of the received data signal. To compensate, a negative edge of CLK (which is equivalent to a positive edge of PHY CLK) is utilized by FF 230 during unlocked mode to increase the time the data of the received data is held steady in order to meet the hold time requirements of FF 230, which is also discussed below in connection with FIGS. 6 and 8. Since PHY CLK and CLK are phase aligned with Source CLK during locked mode and have positive edges that remain substantially aligned with the data of the received data signal, a positive edge of CLK (which is equivalent to a positive edge of PHY CLK) is utilized by FF 230 during locked mode to meet the hold time requirement of FF 230. Similarly, the data output by FF 230 must be provided to FF 235 to satisfy setup and hold time requirements of FF 235 in order for FF 235 to successfully store and output the data provided by FF 230 on a next clock cycle of CLK. Since FF 230 utilizes a negative clock cycle of CLK and FF 235 utilizes a positive clock cycle of CLK, overlap of the data and the positive edge of CLK to meet the hold time requirement is ensured.

The outputs of FF 230 and FF 235 are provided as inputs to a multiplexer 240. Locking control logic 125 is configured to control multiplexer 240 to operate in either unlocked or locked mode, such as by providing unlock enable signal 250 to multiplexer 240, as further described below. The data output from multiplexer 240 is provided to an isolation circuit 245 that is configured to isolate the output of multiplexer 240 from destination internal circuitry (e.g., on-chip synchronous logic 130(2)) when the interconnect circuitry of physical interface 140(2) transitions from unlocked mode to locked mode, as further discussed below in connection with FIG. 5. Isolation circuit 245 is controlled by an isolation enable signal 255 provided by locking control logic 125. When isolation enable 255 is activated, isolation circuit 245 isolates the output of multiplexer 240 from the destination internal circuitry of die 2, such as by outputting some predetermined data signal (e.g., a logic low data signal) as receive data 260 to the destination internal circuitry. When isolation enable 255 is cleared, isolation circuit 245 provides the output of multiplexer 240 as receive data 260 to the destination internal circuitry during both unlocked and locked modes.

Figure 6:
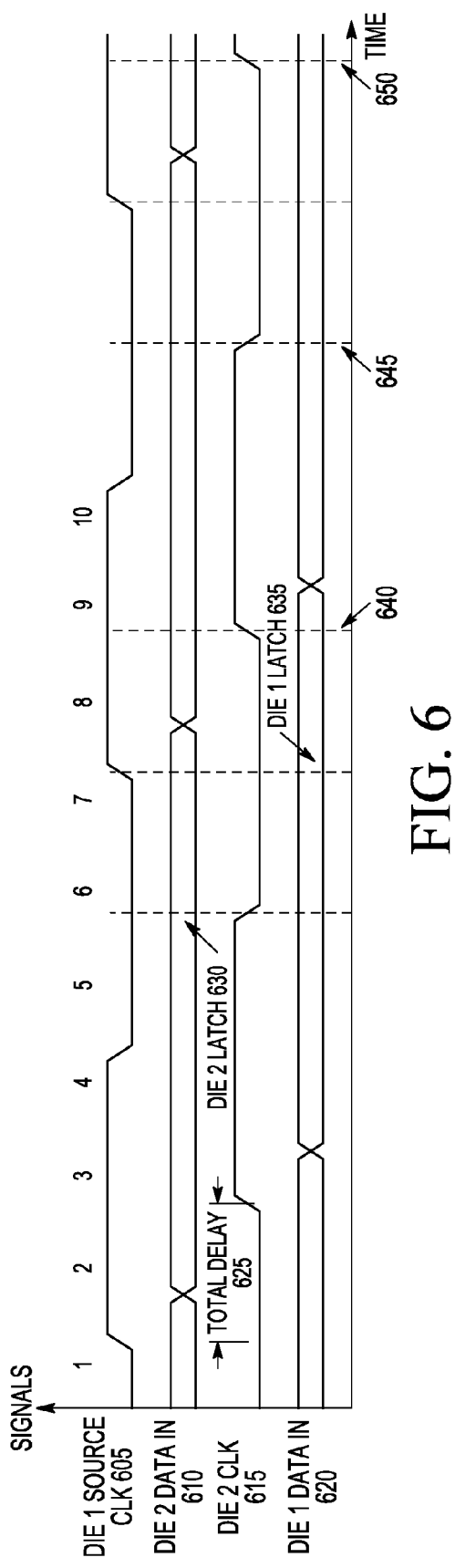
FIG. 6-9 illustrate waveforms of example clock, control, and data signals present at a plurality of nodes of semiconductor devices during unlocked and locked modes of synchronous data communication, according to some embodiments of the present disclosure.

The operation of the interconnect circuitry of FIG. 2 during unlocked mode is discussed with reference to the example waveform diagram illustrated in FIG. 6. A waveform for Die 1 Source CLK 605 is illustrated at the top of FIG. 6, followed by waveforms for Die 2 Data In lines 610 (e.g., data transmitted from die 1 to die 2), Die 2 CLK 615, and Die 1 Data In lines 620 (e.g., data transmitted from die 2 to die 1). It is noted that during unlocked mode, receipt registers on die 1 latch data on the positive edge of Die 1 Source CLK 605, such as latching data on Die 1 Data In lines 620 at time point 635.

During unlocked mode, an amount of total delay 625 is introduced as Source CLK 605 is transmitted to die 2, received as Received Source CLK at die 2, and utilized to generate CLK 615. Total delay 625 includes, but is not limited to, interconnect delay arising from the clock signal traversing interconnect circuitry on die 1 and die 2, delay arising from the clock signal traversing level shifter 205, and clock insertion delay arising from clock generation circuitry and clock distribution network of clock alignment block 210. Also during unlocked mode, CLK 615 and PHY CLK are not phase aligned with Source CLK 605. It is noted that the CLK 615 waveform is substantially equivalent to the waveform of Received Source CLK. During unlocked mode, an inverted version of CLK 615 is utilized as PHY CLK during unlocked mode, and CLK 615 and PHY CLK are not locked with Source CLK on die 1 (and are also not locked with Received Source CLK at die 2). Accordingly, CLK 615 and PHY CLK experience clock insertion delay on die 2, which causes the positive edges of CLK 615 and PHY CLK to lose alignment with data 610 received at die 2. If FF 230 is triggered on the positive edge of CLK 615, the clock insertion delay of CLK 615 will result in data failing to meet setup time or be valid long enough to meet the required hold time (e.g., minimum amount of time the data should be held steady after the positive clock edge of CLK) of FF 230.

To counteract this problem, FF 230 is triggered on the negative edge of CLK 615 (which is equivalent to the positive edge of PHY CLK) during unlocked mode, increasing the amount of time during which received data is valid to meet the required setup and hold time of FF 230. FF 230 latches data 610 at time point 630 (as opposed to latching on the positive edge of CLK 615 at time point 640, which, in the embodiment illustrated, results in loss of data 610 due to data 610 transitioning to a new value). Since data is latched "early" at time point 630 (or before the positive edge of CLK 615 at time point 640) and FF 230 stores the data for a single PHY CLK cycle (e.g., an equivalent cycle measured from negative edge to negative edge of CLK 615), the data needs to be stored for additional time to ensure the data is available at the next positive edge of CLK 615 at time point 650. The embodiment illustrated in FIG. 2 implements FF 235, which is triggered on the positive edge of CLK 615 during unlocked mode, to store the data for a subsequent CLK cycle beginning at time point 640. When unlock enable signal 250 is activated (which indicates that unlocked mode is implemented), multiplexer 240 selects the output from FF 235, where the data is available on the next positive edge of CLK 615 without requiring PHY CLK (and CLK 615) to be phase aligned with Source CLK on die 1.

Figure 7:
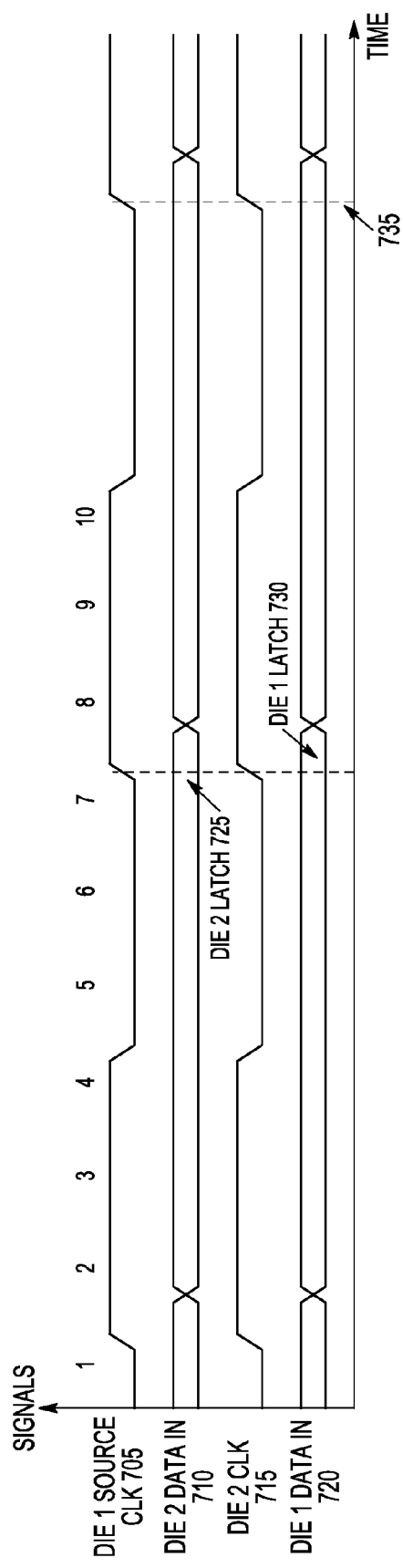

The operation of the interconnect circuitry of FIG. 2 during locked mode is discussed with reference to the example waveform diagram illustrated in FIG. 7. A waveform for Die 1 Source CLK 705 is illustrated at the top of FIG. 7, followed by waveforms for Die 2 Data In lines 710 (e.g., data transmitted from die 1 to die 2), Die 2 CLK 715, and Die 1 Data In lines 720 (e.g., data transmitted from die 2 to die 1). As noted above, an amount of delay is introduced as Source CLK 705 is transmitted to die 2, received as Received Source CLK at die 2, and utilized to generate CLK 715. The delay introduced from transmission between die, as well as clock insertion delay, is compensated for by clock alignment block 210, resulting in CLK 715 being phase aligned with Source CLK 705.

During locked mode, a non-inverted version of CLK 715 is utilized as PHY CLK, resulting in PHY CLK also being phase aligned with Source CLK 705. Since PHY CLK and CLK 715 are phase aligned with Source CLK 705, the positive edges of PHY CLK and CLK 715 remain substantially aligned with data 710, which meets the hold time requirement of FF 230. It is noted that data 710 may also experience a delay that is approximately equal to the interconnect delay (e.g., delay arising from traversing interconnect 120, which may also include delay arising from level shifter 205), as discussed below in connection with FIG. 9. It is noted that during locked mode, receipt registers on die 1 continue to latch data on the positive edge of Die 1 Source CLK 705, such as latching data on Die 1 Data In lines 720 at time point 730.

FF 230 is triggered on the positive edge of CLK 715 during locked mode (which is equivalent to the positive edge of PHY CLK that is a non-inverted version of CLK) and latches data at time point 725. Since data is latched on the positive edge of CLK 715 and FF 230 stores the data for a PHY CLK cycle (e.g., an equivalent cycle measured from positive edge to positive edge of CLK 715), the data is available at the next positive edge of CLK 715 at time point 735, indicating that the data need not be stored by FF 235 for another CLK cycle. When unlock enable signal 250 is cleared (which indicates that locked mode is implemented), multiplexer 240 selects the output from FF 230 (or the next-to-last FF of the successive FFs), where the data is available on a positive edge of CLK 715.

Figure 3:
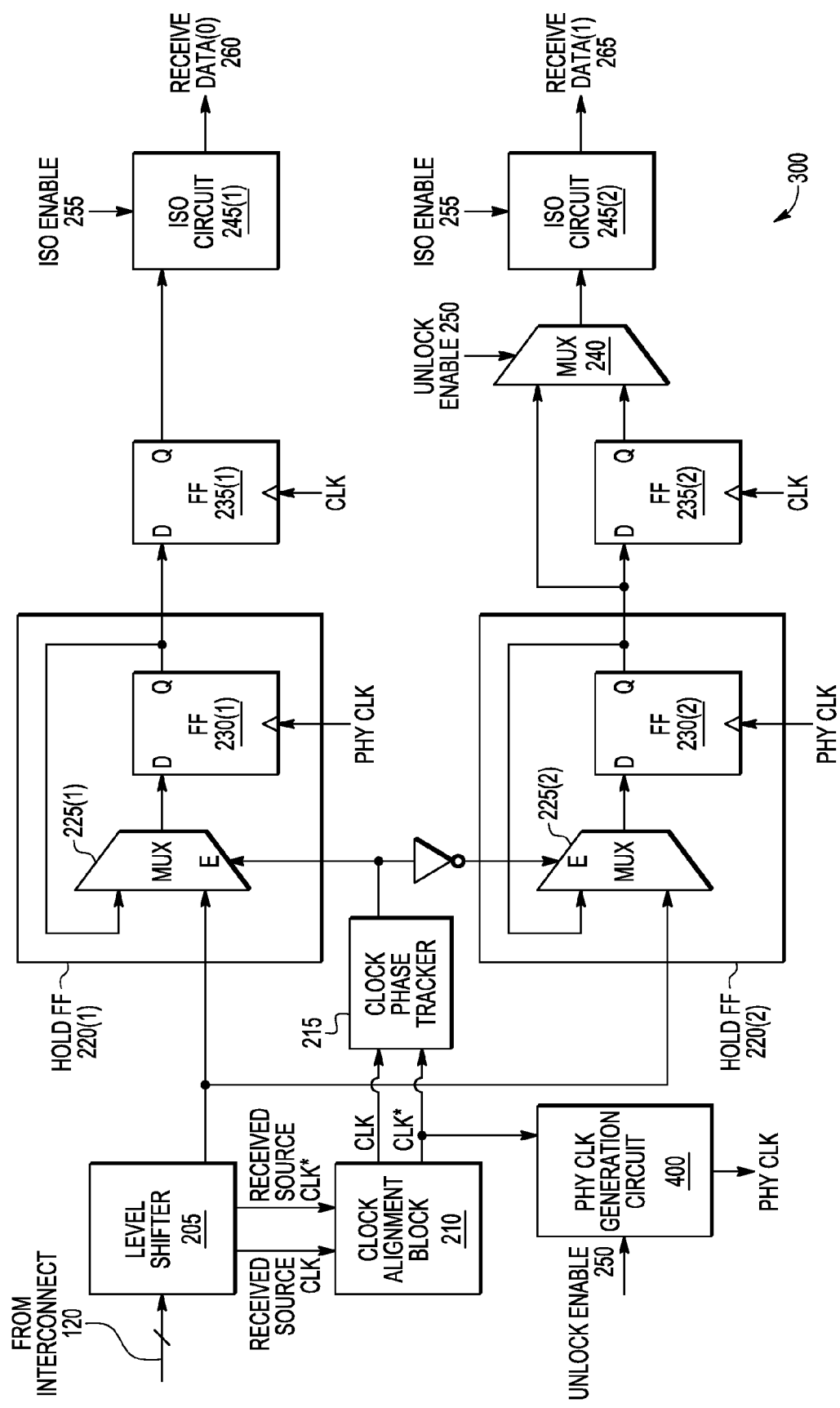

FIG. 3 illustrates another embodiment of interconnect circuitry 300 and locking control logic 125 implemented on a physical interface 140(2) of a secondary semiconductor device, such as die 2 105(2). In the embodiment illustrated, interconnect circuitry of physical interface 140(2) includes a level shifter 205, clock alignment block 210, clock phase tracker 215, hold flip flops (FFs) 220(1)-(2), flip flops 235(1)-(2), multiplexer 240, isolation circuits 245(1)-(2), and physical interface clock signal (PHY CLK) generation circuit 400. Each hold FF 220 includes a multiplexer 225 and a FF 230. Locking control logic 125 is configured to control the interconnect circuitry to operate in either unlocked mode or in locked mode, as further discussed below.

In the embodiment illustrated, die 2 implements time-division multiplexing (TDM) to sequentially transmit and receive data of two or more independent data signals over a common channel (e.g., data of multiple data signals is received over Die 2 Data In data lines and transmitted over Die 1 Data In data lines). The clock cycle of Source CLK is divided into multiple portions, where each clock cycle portion is associated with one of the independent data signals. Each independent data signal is also associated with a respective hold FF 220 implemented in interconnect circuitry of physical interface 140(2). When data is received during a clock cycle portion associated with a given independent data signal, the data is stored in the hold FF 220 associated with the given independent data signal. In the embodiment illustrated, die 2 implements dual signal TDM, where two independent data signals are received on an alternating basis and two hold FFs are implemented to store data of the associated data signals. As discussed herein, hold FF 220(1) is associated with a first independent data signal and hold FF 220(2) is associated with a second independent data signal, although it is noted that the terms "first" and "second" are used to arbitrarily distinguish between the independent data signals and do not necessarily indicate a temporal or other prioritization of the data signals. Operation of the hold FFs 220(1)-(2) is further discussed below.

In the embodiment illustrated, signals received from a primary semiconductor device, such as die 1 105(1), via interconnect 120 are routed to a level shifter 205 of interconnect circuitry. Level shifter 205 includes technology translation circuitry that is configured to adjust signals received from a die (such as die 1) to a level utilized by internal circuitry of die 2. For example, the received signals are at some standard signal level, where level shifter 205 adjusts the standard signals levels to match lower or higher signal levels used by internal circuitry of die 2. The signals received from die 1 include two clock signals, Source CLK and Source CLK*, where Source CLK* has a faster frequency than Source CLK (e.g., twice as fast), indicating the number of portions into which the clock cycle of Source CLK is divided (e.g., two). In the embodiment illustrated, level shifter 205 provides a level-shifted version of the two clock signals (illustrated as Received Source CLK and Received Source CLK*) to clock alignment block 210 as input clock signals. The signals received from die 1 also include a TDM data signal, where level shifter 205 provides a level-shifted version of the TDM data signal to hold FFs 220(1) and 220(2).

In other embodiments, level shifter 205 is not included in interconnect circuitry of physical interface 140(2) (e.g., level shifter may instead be included in interconnect circuitry of physical interface 140(1) of die 1, or level shifter may not be present on either die 1 or die 2). In such embodiments, the TDM data signal and clock signals received via interconnect 120 are instead respectively routed to hold FFs 220(1)-(2) and clock alignment block 210.

Clock alignment block 210 includes clock generation circuitry to utilize the two input clock signals to generate one or more clock signals including a clock signal (illustrated as CLK) having a clock frequency (e.g., the clock frequency of Source CLK) and another clock signal (illustrated as CLK*) having a clock frequency that is faster than CLK's clock frequency by some factor (e.g., twice as fast, or the clock frequency of Source CLK*). PHY CLK generation circuit 400 is implemented on physical interface 140(2) and is configured to utilize CLK* to generate a clock signal for physical interface 140(2), referred to as PHY CLK, which is discussed below in connection with FIG. 4. Clock alignment block 210 also includes a clock distribution network that distributes a number of clock signals to synchronous elements on die 2, including distributing CLK and CLK* to clock phase tracker 215.

Locking control logic 125 is configured to control clock alignment block 210 to operate in either unlocked or locked mode, such as by providing an unlock enable signal 250 to clock alignment block 210 that indicates the present mode of operation. During unlocked mode, clock alignment block 210 is configured to provide Received Source CLK and Received Source CLK* to clock phase tracker 215 as CLK and CLK*, respectively (where Received Source CLK has a low clock frequency of less than 300 MHz during unlocked mode). During locked mode, clock alignment block 210 is configured to generate CLK and CLK* from Received Source CLK and Received Source CLK*, respectively, and to phase align CLK on die 2 (where CLK has a clock frequency equal to or greater than 300 MHz during locked mode) with Source CLK on die 1, as well as phase align CLK* on die 2 with Source CLK* on die 1. Examples of circuitry included in clock alignment block 210 include but are not limited to a delay-locked loop (DLL), a phase-locked loop (PLL), and similar circuitry configured to generate an adjustable periodic clock signal.

PHY CLK generation circuit 400 receives CLK* and unlock enable signal 250. PHY CLK generation circuit 400 is configured to generate PHY CLK based on CLK* during the unlocked and locked modes, as indicated by unlock enable signal 250. The clock frequency of PHY CLK is substantially equal to the clock frequency of CLK* during both modes. PHY CLK is provided to the hold FFs 220 of physical interface 140(2). During unlocked mode, PHY CLK is equivalent to an inverted version of CLK* on physical interface 140(2). During locked mode, PHY CLK is equivalent to a non-inverted version of CLK*. Hold FFs 220(1) and 220(2) are configured to latch data on the negative edge of CLK* during unlocked mode and latch data on the positive edge of CLK* during locked mode, as further discussed below. To achieve this triggering scheme, both FFs are clocked by PHY CLK and are triggered to store data on the positive edge of PHY CLK in both unlocked and locked modes, where the positive edge of PHY CLK is aligned with the negative edge of CLK during unlocked mode and where the positive edge of PHY CLK is aligned with the positive edge of CLK during locked mode.

During unlocked mode, CLK* is not phase aligned with Source CLK* on die 1, where CLK* is a delayed version of Source CLK* by some total delay. Such total delay similarly includes, but is not limited to, interconnect delay arising from the clock signal traversing interconnect circuitry on die 1 and die 2, delay arising from the clock signal traversing level shifter 205, and clock insertion delay arising from clock generation circuitry and clock distribution network of clock alignment block 210. Since CLK* is delayed, PHY CLK is similarly delayed by at least the total delay (and may include additional delay arising from propagation delay introduced in PHY CLK generation circuitry). During locked mode, CLK* is phase aligned with Source CLK* on die 1, where PHY CLK is phase aligned with CLK* within some minimal range. PHY CLK generation circuit 400 is further described below in connection with FIG. 4.

Clock phase tracker 215 is configured to output one or more enable signals for the hold FFs implemented on physical interface 140(2), where each hold FF is enabled during a respective clock cycle portion during which data of the hold FF's associated data signal is received. Since dual TDM is implemented in the embodiment illustrated (i.e., the clock cycle is divided into two portions), hold FF 220(1) and hold FF 220(2) are alternately enabled by clock phase tracker 215. Clock phase tracker 215 includes circuitry that is configured to compare the phases of CLK and CLK* and outputs an enable signal to hold FF 220(1). The enable signal is activated during the clock cycle portion during which data of the first independent data signal is received, which enables hold FF 220(1) to store the data. A complementary enable signal is provided to hold FF 220(2), as illustrated by an inverter coupled to the output of clock phase tracker 215 that is provided to hold FF 220(2). The complementary enable signal is activated during the clock cycle portion during which data of the second independent data signal is received, which enables hold FF 220(2) to store the data.

Hold FF 220(1) includes a multiplexer 225(1) and a FF 230(1). The enable signal output by clock phase tracker 215 is utilized as an enable signal E for multiplexer 225(1), where the TDM data signal output by level shifter 205 is provided as an input to multiplexer 225(1). An output of multiplexer 225(1) is provided as an input to FF 230(1), which is clocked by PHY CLK. An output of FF 230(1) is provided as a feedback input to multiplexer 225(1). When enable signal E is activated (which indicates that present TDM data associated with hold FF 220(1) is received), multiplexer 225(1) selects the TDM data signal input. Multiplexer 225(1) provides the TDM data signal as output to FF 230(1). Once the clock cycle portion is complete, clock phase tracker 215 clears enable signal E, which causes multiplexer 225(1) to select the feedback input. Multiplexer 225(1) similarly provides the feedback input as output to FF 230(1), satisfying setup and hold time requirements, enabling FF 230(1) to store and output the present TDM data. In this manner, FF 230(1) continues to store and output the present TDM data until multiplexer 225(1) selects the TDM data signal input.

The TDM data signal must be held steady for a minimum amount of time prior to a positive clock edge of PHY CLK to satisfy setup time requirements of FF 230(1), and must also be held steady for a minimum amount of time subsequent to the positive clock edge of PHY CLK to satisfy hold time requirements of FF 230(1). When setup and hold times are met, FF 230(1) successfully stores and outputs the present TDM data. Due to clock insertion delay experienced on die 2 (since PHY CLK and CLK* are not phase aligned with Source CLK), the positive edges of PHY CLK lose alignment with the TDM data. To compensate, a negative edge of CLK* (which is equivalent to a positive edge of PHY CLK) is utilized by FF 230(1) during unlocked mode to increase the time that the TDM data is held steady in order to meet the hold time requirements of FF 230(1), which is also discussed below in connection with FIG. 8. Thus, in unlocked mode, the frequency of Source CLK is limited to approximately half of the die-to-die delay plus die 2 clock insertion delay. Since PHY CLK and CLK* are phase aligned with Source CLK during locked mode and have positive edges that remain substantially aligned with the data of the received data signal, a positive edge of CLK* (which is equivalent to a positive edge of PHY CLK) is utilized by FF 230(1) during locked mode to meet the hold time requirement of FF 230. The output of FF 230(1) (which is also the output of hold FF 220(1)) is provided to FF 235(1), which is clocked by CLK. FF 230(1) continues to output the data long enough for the setup and hold time requirements of FF 235(1) to be met. Thus, in locked mode, the frequency of Source CLK can be significantly faster and is limited only by the die-to-die delay.

The output of FF 235(1) is provided to an isolation circuit 245(1) that is configured to isolate the output of FF 235(1) from destination internal circuitry (e.g., on-chip synchronous logic 130(2)) when the interconnect circuitry of physical interface 140(2) transitions from unlocked mode to locked mode, as further discussed below in connection with FIG. 5. Isolation circuit 245(1) is controlled by an isolation enable signal 255 provided by locking control logic 125. When isolation enable 255 is activated, isolation circuit 245(1) isolates the output of FF 235(1) from the destination internal circuitry of die 2, such as by outputting some predetermined data signal (e.g., a logic low data signal) as receive data(0) 260 to the destination internal circuitry. When isolation enable 255 is cleared, isolation circuit 245

(1) provides the output of FF 235(1) as receive data(0) 260 to the destination internal circuitry during both unlocked and locked modes.

Hold FF 220(2) includes a multiplexer 225(2) and a FF 230(2). The complementary enable signal received by hold FF 220(2) is utilized as an enable signal E for multiplexer 225(2), where the TDM data signal output by level shifter 205 is also provided as an input to multiplexer 225(2). An output of multiplexer 225(2) is provided as an input to FF 230(2), which is also clocked by PHY CLK. An output of FF 230(2) is provided as a feedback input to multiplexer 225(2). Hold FF 220(2) operates similarly to hold FF 220(1), as described above. When enable signal E of multiplexer 225(2) is activated (which indicates that present TDM data associated with hold FF 220(2) is received), multiplexer 225(2) selects the TDM data signal input and provides the TDM data signal to FF 230(2), similarly satisfying setup and hold time requirements of 230(2) by utilizing the negative edge of CLK* during unlocked mode and the positive edge of CLK* during locked mode. FF 230(2) continues to store and output the present TDM data until multiplexer 225(2) selects the TDM data signal input.

The output of FF 230(2) (which is also the output of hold FF 220(2)) is provided to a multiplexer 240. The output of FF 230(2) is also provided to FF 235(2), which is clocked by CLK. Similarly, the data output by FF 230(2) must be provided to FF 235(2) to satisfy setup and hold time requirements of FF 235(2) in order for FF 235(2) to successfully store and output the data provided by FF 230(2) on a next clock cycle of CLK. Since FF 230(2) utilizes a negative clock cycle of CLK* and FF 235(2) utilizes a positive clock cycle of CLK, overlap of the data and the positive edge of CLK* to meet the hold time requirement is ensured.

The output of FF 235(2) is also provided to multiplexer 240. Locking control logic 125 is configured to control multiplexer 240 to operate in either unlocked or locked mode, such as by providing unlock enable signal 250 to multiplexer 240, as further discussed below. The output of multiplexer 240 is provided to an isolation circuit 245(2) that is configured to isolate the output of multiplexer 240 from destination internal circuitry (e.g., on-chip synchronous logic 130(2)) when the interconnect circuitry of physical interface 140(2) transitions from unlocked mode to locked mode, as further discussed below in connection with FIG. 5. Isolation circuit 245(2) is controlled by isolation enable signal 255 provided by locking control logic 125. When isolation enable 255 is activated, isolation circuit 245(2) isolates the output of multiplexer 240 from the destination internal circuitry of die 2, such as by outputting some predetermined data signal (e.g., a logic low data signal) as receive data (1) 265 to the destination internal circuitry. When isolation enable 255 is cleared, isolation circuit 245(2) provides the output of multiplexer 240 as receive data (1) 265 to the destination internal circuitry during both unlocked and locked modes.

Figure 8:
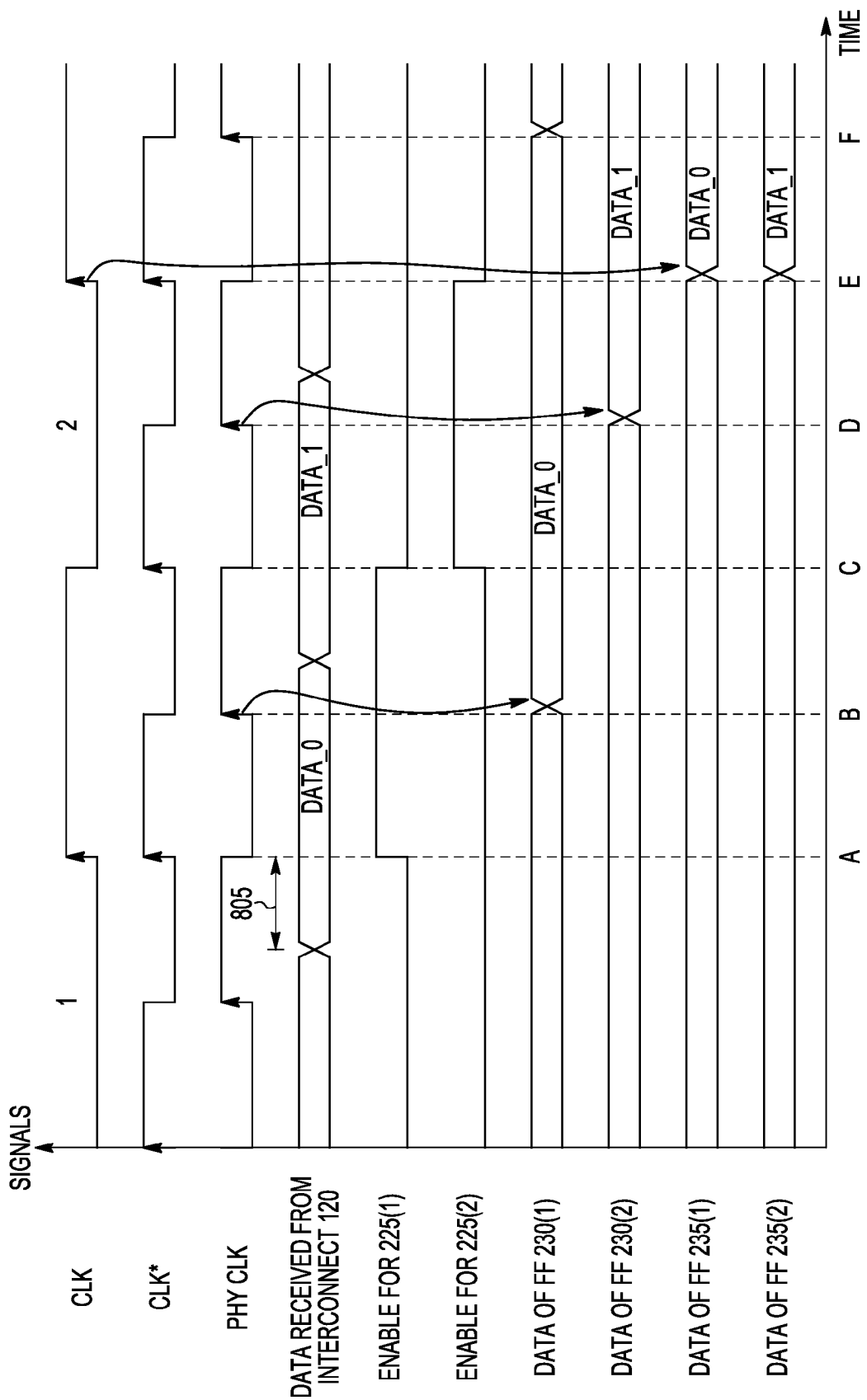

The operation of the interconnect circuitry of FIG. 3 during unlocked mode is discussed with reference to the example waveform diagram illustrated in FIG. 8. Waveforms for CLK and CLK* that are output by clock alignment block 210 are illustrated at the top of FIG. 8, followed by waveforms for PHY CLK, data received from interconnect 120, an enable signal for multiplexer 225(1), an enable signal for multiplexer 225(2), data stored by FF 230(1), data stored by FF 230(2), data stored by FF 235(1), and data stored by FF 235(2). CLK* has a clock frequency that is some factor faster than the clock frequency of CLK (e.g., four times as fast). In the embodiment illustrated, PHY CLK is an inverted version of CLK* during unlocked mode, where positive edges of PHY CLK are aligned with negative edges of CLK*. It is noted that during unlocked mode, receipt registers on die 1 latch data on the positive edge of Source CLK.

Since TDM communication is implemented in the embodiment of FIG. 3, the data received from interconnect 120 includes alternating TDM data of multiple TDM data signals. The TDM data alternates on positive edges of Source CLK* (not shown in FIG. 8). Source CLK, Source CLK*, and TDM data experience a same amount of delay as they are transmitted from die 1 to die 2 via interconnect 120. Once received at die 2, CLK and CLK* are generated using Received Source CLK*, Received Source CLK, or both signals. During unlocked mode, CLK and CLK* (and PHY CLK, which is generated from CLK*) are not locked with Source CLK* on die 1 (and are also not locked with Received Source CLK*) and accordingly experience clock insertion delay on die 2. As CLK and CLK* experience such delay, the positive edges of CLK and CLK* lose alignment with TDM data. If FFs 230(1) and 230(2) are triggered on the positive edge of CLK*, the clock insertion delay of CLK* will result in TDM data failing to be valid long enough to meet the required setup and hold time (e.g., minimum amount of time the data should be held steady after the positive clock edge of CLK) of FFs 230(1) and 230(2).

To counteract this problem, FFs 230(1) and 230(2) are triggered on the negative edge of CLK* (which is equivalent to the positive edge of PHY CLK) during unlocked mode, increasing the amount of time during which TDM data is valid to meet the required setup time and hold time of FFs 230(1) and 230(2). To ensure that the TDM data of the TDM data signals are synchronously available to the destination internal circuitry, FFs 235(1) and 235(2) are triggered on a positive edge of CLK during unlocked mode (as well as during locked mode).

In the embodiment illustrated, data_0 is received from interconnect 120 at a positive edge of Received Source CLK* (not shown) prior to time point A. However, CLK, CLK*, and PHY CLK experience clock insertion delay 805 and their clock cycles do not transition until time point A. Since data_0 is part of a TDM data signal associated with FF 230(1), clock phase tracker 215 outputs an activated enable signal for multiplexer 225(1) during the associated clock cycle portion of CLK (e.g., from time point A to time point C), triggering multiplexer 225(1) to select the TDM data input. Rather than trigger on the positive edge of CLK* (which may result in violation of setup and hold times), FF 230(1) is triggered on the negative edge of CLK* (which is equivalent to the positive edge of PHY CLK) and latches data_0 at time point B, which is before the next positive edge of CLK at time point E. This also ensures that data_0 is valid long enough to meet required setup and hold times of FF 230(1). Since data_0 is latched "early" at time point B, FF 230(1) stores the data for enough positive PHY CLK cycles (e.g., from positive edge to positive edge) to reach the next positive edge of CLK at time point E. In the embodiment of FIG. 3, FF 230(1) stores data_0 for two PHY CLK cycles, from time point B to time point F.

Subsequently, data_1 is received from interconnect 120 at a positive edge of Received Source CLK* (not shown) prior to time point C. Since data_1 is part of a TDM data signal associated with FF 230(2), clock phase tracker 215 outputs an activated enable signal for multiplexer 225(2) during the associated clock cycle portion of CLK (e.g., from time point C to time point E), triggering multiplexer 225(2) to select the TDM data input. Rather than trigger on the positive edge of CLK* (which may result in violation of setup and hold times), FF 230(2) is also triggered on the negative edge of CLK* (which is equivalent to the positive edge of PHY CLK) and latches at a next positive edge of PHY CLK at time point D. In the embodiment of FIG. 3, the enable signals for multiplexers 225(1) and (2) are complementary. For simplicity's sake, the enable signals for multiplexers 225(1) and (2) are both cleared in FIG. 8 after time point E in order to show a single TDM data transfer. Also, since TDM data is received from interconnect 120 in an alternating manner, FFs 230(1) and 230(2) (of hold FFs 220(1) and 220(2)) respectively store TDM data for the same number of PHY CLK cycles to maintain synchronicity of TDM data, but starting at different times after a positive edge of CLK.

At the next positive edge of CLK at time point E, FF 235(1) and FF 235(2) are triggered to respectively store data_0 and data_1, where data_0 and data_1 are available on the next positive edge of CLK without requiring PHY CLK (and CLK and CLK*) to be phase aligned with Source CLK on die 1. The output of FF 235(1) is provided to isolation circuit 245(1). When unlock enable signal 250 is activated (which indicates that unlocked mode is implemented), multiplexer 240 selects the output from FF 235(2) and provides it to isolation circuit 245(2). Isolation circuit 245(1) outputs data_0 as receive data (0) to destination internal circuitry, and isolation circuit 245(2) outputs data_1 as receive data (1) to destination internal circuitry.

Figure 9:
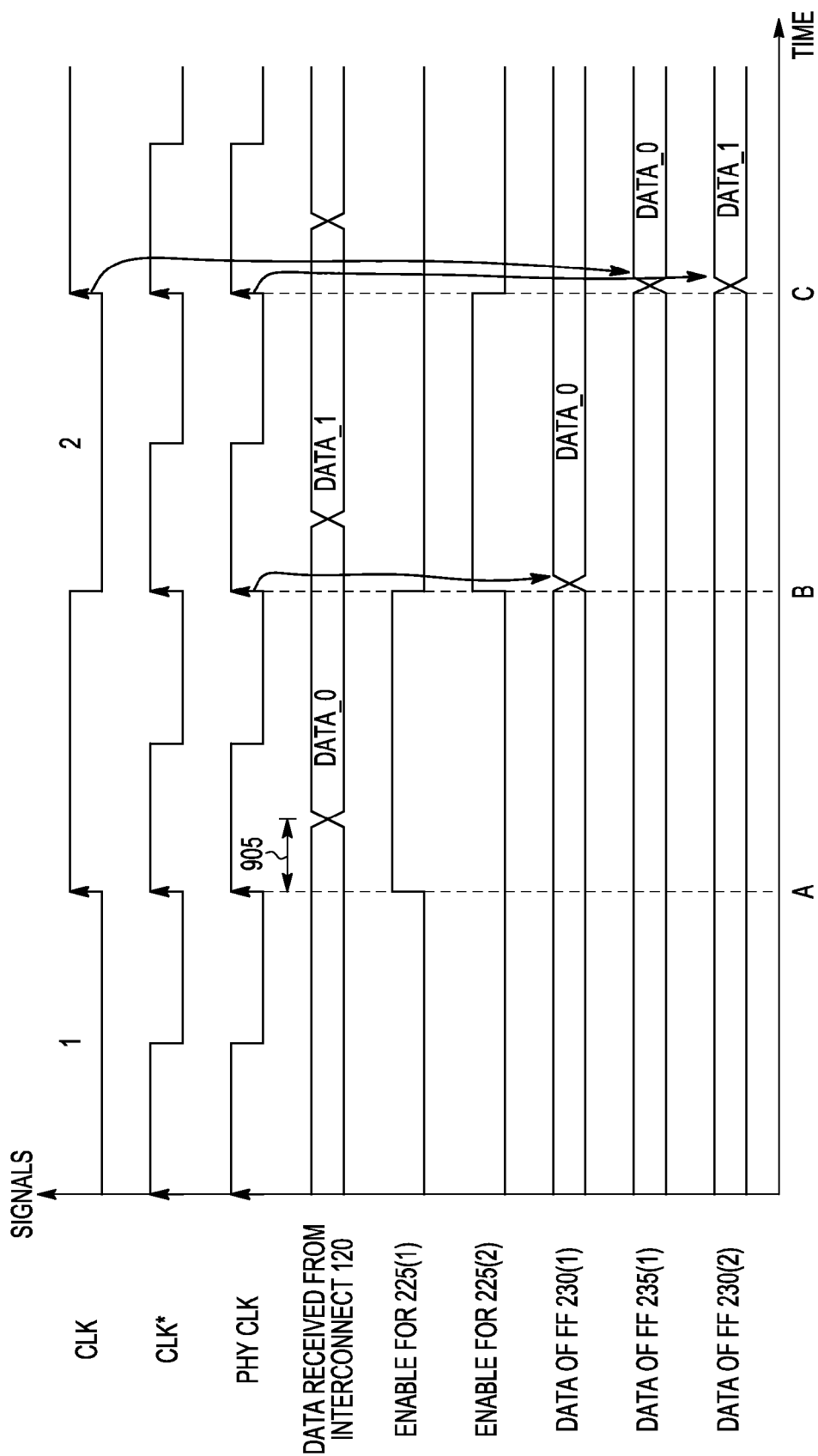

The operation of the interconnect circuitry of FIG. 3 during locked mode is discussed with reference to the example waveform diagram illustrated in FIG. 9. Waveforms for CLK and CLK* that are output by clock alignment block 210 are illustrated at the top of FIG. 9, followed by waveforms for PHY CLK, data received from interconnect 120, an enable signal for multiplexer 225(1), an enable signal for multiplexer 225(2), data stored by FF 230(1), data stored by FF 235(1), and data stored by FF 235(2). CLK* has a clock frequency that is some factor faster than the clock frequency of CLK (e.g., twice as fast). In the embodiment illustrated, PHY CLK is a non-inverted version of CLK* during locked mode, where positive edges of PHY CLK are aligned with positive edges of CLK*. It is noted that during locked mode, receipt registers on die 1 continue to latch data on the positive edge of Source CLK.

As noted above, Source CLK, Source CLK*, and TDM data experience a same amount of delay as they are transmitted from die 1 to die 2 via interconnect 120. Once received at die 2, CLK and CLK* are generated using Received Source CLK*, Received Source CLK, or both signals. During locked mode, CLK and CLK* (and PHY CLK, which is generated from CLK*) are locked with Source CLK* on die 1. As TDM data continues to be received from die 1, the TDM data experiences a delay 905 (as compared with Source CLK* that is locked with CLK*) that is approximately equal to the interconnect delay (e.g., delay arising from traversing interconnect 120, which may also include delay arising from level shifter 205).

In the embodiment illustrated, data_0 is received from interconnect 120 subsequent to the clock cycle transition at time point A, due to delay 905. Since data_0 is part of a TDM data signal associated with FF 230(1), clock phase tracker 215 outputs an activated enable signal for multiplexer 225(1) during the associated clock cycle portion of CLK (e.g., from time point A to time point B), triggering multiplexer 225(1) to select the TDM data input. FF 230(1) is triggered on a positive edge of PHY CLK during locked mode and latches data_0 at time point B, which is before the next positive edge of CLK at time point C. This also ensures that data_0 is valid long enough to meet required setup and hold times of FF 230(1). Since data_0 is latched early at time point B, FF 230(1) stores the data for enough positive PHY CLK cycles to reach the next positive edge of CLK at time point C. In the embodiment of FIG. 3, FF 230(1) stores data_0 for two PHY CLK cycles, starting from time point B.

Data_1 is received from interconnect 120 subsequent to time point B, also due to delay 905. Since data_1 is part of a TDM data signal associated with FF 230(2), clock phase tracker 215 outputs an activated enable signal for multiplexer 225(2) during the associated clock cycle portion of CLK (e.g., from time point B to time point C), triggering multiplexer 225(2) to select the TDM data input. FF 230(2) is triggered on a next positive edge of PHY CLK and latches data_1 at time point C, which coincides with the next positive edge of CLK. As noted above, FFs 230(1) and 230(2) respectively store TDM data for the same number of PHY CLK cycles to maintain synchronicity of TDM data, but starting at different times after a positive edge of CLK. Also, for simplicity's sake, the enable signals for multiplexers 225(1) and (2) are both cleared in FIG. 9 after time point C.

At the next positive edge of CLK at time point C, FFs 235(1) and 235(2) are triggered to respectively store data_0 and data_1. The output of FF 235(1) is provided to isolation circuit 245(1). When unlock enable signal 250 is cleared (which indicates that locked mode is implemented), multiplexer 240 selects the output of FF 230(2) since data_1 is available in FF 230(2) at the next positive edge of CLK at time point C. Multiplexer 240 provides the output to isolation circuit 245(2). Isolation circuit 245(1) outputs data_0 as receive data (0) to destination internal circuitry, and isolation circuit 245(2) outputs data_1 as receive data (1) to destination internal circuitry.

Figure 4:
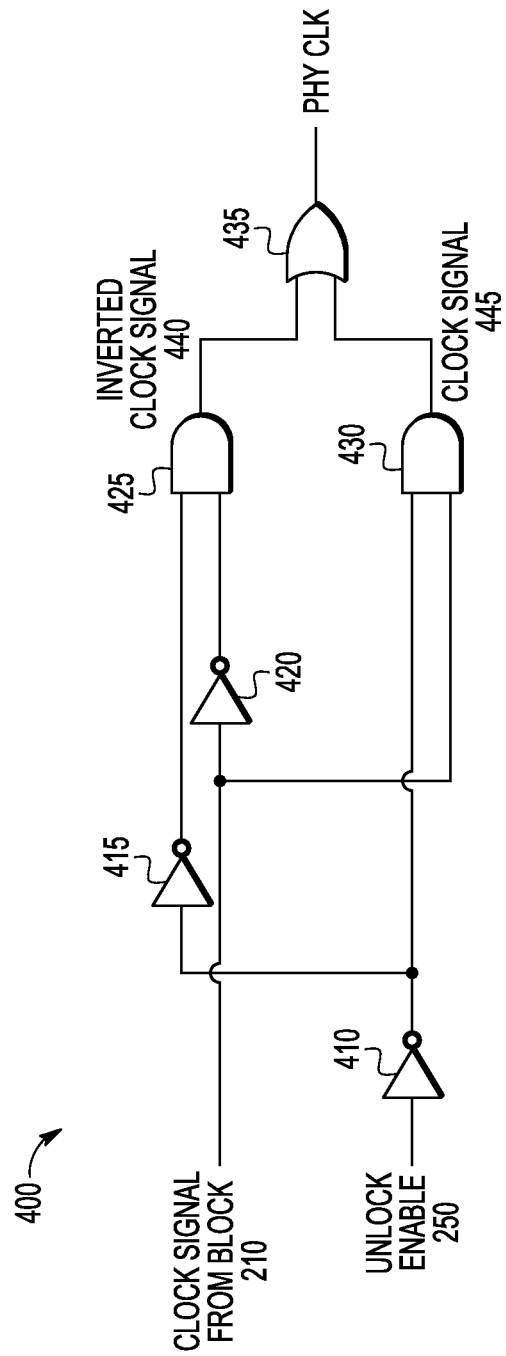
FIG. 4 illustrates example clock generation circuitry implemented on a physical interface of a secondary semiconductor device, according to some embodiments of the present disclosure.

FIG. 4 illustrates example clock generation circuitry 400 implemented on physical interface 140(2) of a secondary semiconductor device, such as die 2 105(2). Clock generation circuitry 400 has two inputs. When implemented in an embodiment like that illustrated in FIG. 2, the two inputs include CLK (or the clock signal that is provided by clock alignment block 210) and unlock enable signal 250. When implemented in an embodiment like that illustrated in FIG. 3, the two inputs include CLK* (or the clock signal that is provided by clock alignment block 210) and unlock enable signal 250 that is provided by locking control logic 125, which is further discussed below.

Unlock enable 250 is provided as an input to inverter 410, which outputs an inverted unlock enable signal that in turn is provided as an input to inverter 415 and as an input to logic gate 430. The clock signal from block 210 is provided as an input to inverter 420 and as another input to logic gate 430. In the embodiment illustrated, logic gate 430 implements an AND logic function and is configured to output a logic high when both inputs are logic high, such as when the clock signal from block 210 is high and unlock enable 250 is logic low. The output of logic gate 430 is equivalent to the clock signal from block 210 during locked mode (i.e., locked mode is indicated when unlock enable is logic low).

The outputs of inverter 415 and inverter 420 are provided as inputs to logic gate 425. In the embodiment illustrated, logic gate 425 implements an AND logic function and is configured to output a logic high when both inputs are logic high, such as when the clock signal from block 210 is low and unlock enable 250 is logic high. The output of logic gate 425 is equivalent to an inverted version of the clock signal from block 210 during unlocked mode (i.e., unlocked mode is indicated when unlock enable is logic high).

The outputs of logic gates 425 and 430 are provided as inputs to logic gate 435. In the embodiment illustrated, logic gate 435 implements an OR logic function and is configured to output a logic high when either inputs are logic high. The output of logic gate 435 is PHY CLK, which is provided to FFs 230 of physical interface 140(2). In this manner, PHY CLK is equivalent to an inverted version of CLK* during unlocked mode, while PHY CLK is equivalent to a non-inverted version of CLK* during locked mode, when PHY CLK generation circuitry is implemented in an embodiment like that illustrated in FIG. 3. Similarly, PHY CLK is equivalent to an inverted version of CLK during unlocked mode, while PHY CLK is equivalent to a non-inverted version of CLK during locked mode, when PHY CLK generation circuitry is implemented in an embodiment like that illustrated in FIG. 2.

Figure 5:
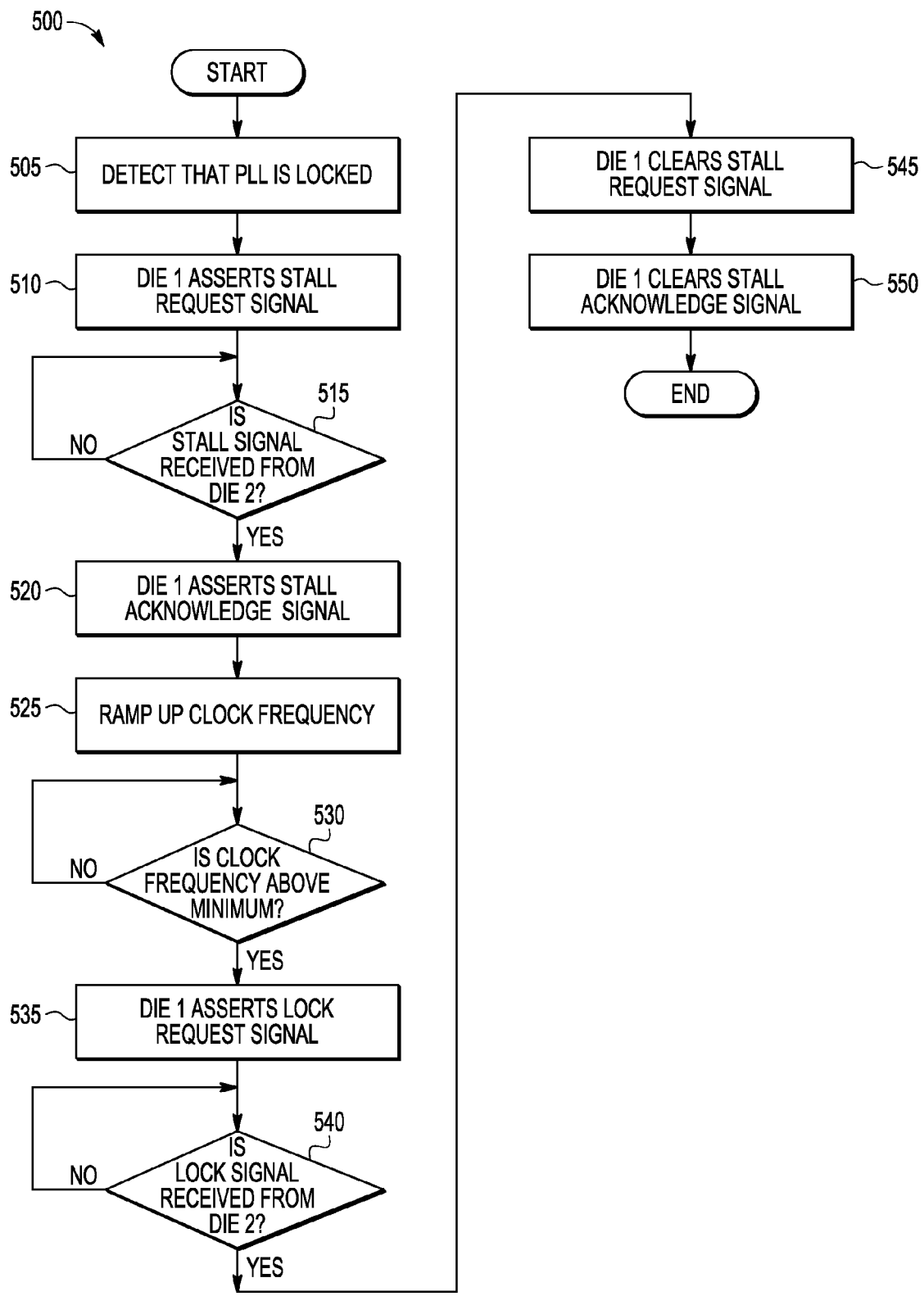
FIG. 5 illustrates a flowchart depicting a process implemented by transition control logic implemented on a physical interface of a primary semiconductor device, according to some embodiments of the present disclosure.

FIG. 5 illustrates a flowchart depicting a process implemented by transition control logic 115 implemented on physical interface 140(1) of a primary semiconductor device, such as die 1 105(1). Upon start-up (e.g., after a reset of the SiP package), die 1 and die 2 are configured (e.g., by default) to perform synchronous communication in unlocked mode, where Source CLK is generated by an oscillator of a PLL, internal oscillator, external oscillator, and the like, on die 1. Locking control logic 125 generates unlock enable signal 250 that indicates the unlocked mode of operation is selected (e.g., outputs an activated unlock enable signal 250). Source CLK is phase aligned on die 1, where Source CLK is synchronous across all logic in the same clock domain. The process in FIG. 5 illustrates an example transition process from unlocked mode to locked mode.

The process illustrated in FIG. 5 starts at operation 505, where transition control logic 115 detects whether the PLL on die 1 is locked and compensates for any clock delay experienced by Source CLK as it travels between die 1 and die 2, as well as the clock insertion delay experienced by Source CLK on die 2. In response to the PLL being locked, the process continues to operation 510, where transition control logic 115 on die 1 begins the transition from unlocked mode to locked mode by asserting a stall request signal. By asserting stall request signal, transition control logic 115 stops die 1 from issuing new transactions to die 2 and completes any in-progress data transactions in die 1's transmit registers.

The stall request signal is received by locking control logic 125 and indicates to locking control logic 125 on die 2 that transition from unlocked mode to locked mode is initiated by transition control logic 115. In response to the asserted stall request signal, locking control logic 125 stops die 2 from issuing new data transactions to die 1 and completes any in-progress data transactions in die 2's transmit and receive registers. Locking control logic 125 indicates to die 1 that all of die 2's data transactions associated with die 1 are complete by asserting a stall signal, which receipt is detected by transition control logic 115 in operation 515 of FIG. 5. If the stall signal is not received (or receipt is not detected) by transition control logic 115, the process returns to operation 515 to wait for receipt of the stall signal.

In response to detecting that the stall signal is received, the process continues to operation 520, where transition control logic 115 on die 1 acknowledges the stall signal by asserting a stall acknowledge signal that is received by locking control logic 125. Once stall acknowledge signal is asserted, transition control logic 115 and locking control logic 125 both locally assert an isolation enable signal to isolate or disregard any invalid data in the local receipt registers from internal destination circuitry on the respective die. For example, locking control logic 125 outputs an activated isolation enable 255 that controls isolation circuit(s) 245 to output a predetermined data signal (e.g., a non-asserted signal or logic low data signal) to isolate the output of die 2's receipt registers (e.g., FF(s) 235) from the destination internal circuitry of die 2. Operations 510, 515, and 520 may also be referred to herein as stall communication between die 1 and die 2 (e.g., between transition control logic 115 and locking control logic 125). Die 1 and die 2 continue to operate normally during stall communication, although they are temporarily stalled from communicating with one another.

The process continues to operation 525, where transition control logic 115 initiates the ramp up of the clock frequency of the oscillator of the PLL to a minimum frequency. In some embodiments, the clock frequency is ramped up to a minimum frequency above 300 MHz. The process continues to operation 530, where transition control logic 115 detects whether the clock frequency is above the minimum frequency. If the clock frequency is not above the minimum frequency, the process returns to operation 530 to wait for the clock frequency to ramp up to the minimum frequency.

In response to detecting that the clock frequency is above the minimum frequency, the process continues to operation 535, where transition control logic 115 on die 1 asserts a lock request signal that is received by locking control logic 125. The lock request signal indicates to locking control logic 125 to lock onto the now-faster Source CLK signal received from die 1. Once the clock locking circuitry (such as PLL, DLL, and the like) of die 2 has locked onto Source CLK signal (and has compensated for delay arising from the Source CLK signal traversing interconnect circuitry, level shifter, and clock insertion delay on die 2), locking control logic 125 indicates to die 1 that die 2 has locked on by asserting a lock signal, which receipt is detected by transition control logic 115 in operation 540 of FIG. 5. If the lock signal is not received (or receipt is not detected) by transition control logic 115, the process returns to operation 540 to wait for receipt of the lock signal.

In response to detecting that the lock signal is received, the process continues to operation 545, where transition control logic 115 on die 1 clears stall request signal. At this point, the clocks on die 1 and die 2 are locked and no data transactions are in progress. The process continues to operation 550, where transition control logic 115 clears stall acknowledge signal. Once stall acknowledge signal is cleared, transition control logic 115 and locking control logic 125 both locally clear the isolation enable signal, which controls isolation circuit(2) 245 to provide the output of FF(s) 235 to the destination internal circuitry. Also in response to cleared stall acknowledge signal, both die 1 and die 2 begin initiating transactions between die 1 and die 2 for synchronous communication in locked mode, utilizing the now-faster Source CLK signal received from die 1. Also in response to cleared stall acknowledge signal, locking control logic 125 generates unlock enable signal 250 that indicates die 2 is in the locked mode of operation (e.g., outputs a cleared unlock enable signal 250). The process of FIG. 5 then ends, resulting in Source CLK on die 1 in phase alignment with Received Source CLK on die 2. Operations 530, 535, 540, 545, 550, and 555 may be referred to herein as lock communication between die 1 and die 2 (e.g., between transition control logic 115 and locking control logic 125).

By now it should be appreciated that there has been provided embodiments for synchronous data communication between synchronous logic partitioned onto two devices, even when conventional clock synchronizing components are non-operational. In one embodiment of the present disclosure, a semiconductor device is provided that includes locking control logic implemented on a physical interface of the semiconductor device, where the locking control logic is configured to generate a mode control signal that indicates one of an unlock mode of operation and a lock mode of operation of the semiconductor device. The semiconductor device also includes interconnect circuitry implemented on the physical interface, where the interconnect circuitry includes clock generation circuitry coupled to an interconnect and configured to receive a local clock signal that is generated on the semiconductor device based on a source clock signal that is received from a host semiconductor device via the interconnect, and output a physical interface (PHY) clock signal based on the local clock signal. The PHY clock signal includes the local clock signal during the lock mode of operation, and the PHY clock signal includes an inverted version of the local clock signal during the unlock mode of operation. The semiconductor device also includes a first flip flop (FF) having an input coupled to the interconnect to receive data from the interconnect, having a clock input coupled to the PHY clock signal, and configured to latch the data at a positive edge of the PHY clock signal during the unlock mode of operation and the lock mode of operation.

One aspect of the above embodiment provides that the interconnect circuitry further includes a second FF having a clock input configured to receive the local clock signal, having an input coupled to an output of the first FF to receive the data from the first FF, and configured to latch the data on the positive edge of the local clock signal during the unlock mode of operation and the lock mode of operation.

Another aspect of the above embodiment provides that the interconnect circuitry further includes a multiplexer having a first input coupled to the output of the first FF, having a second input coupled to an output of the second FF, and configured to select the first input during the lock mode of operation, and select the second input during the unlock mode of operation.

A further aspect of the above embodiment provides that the interconnect circuitry further includes an isolation circuit having an input coupled to the output of the multiplexer, having an output coupled to internal circuitry of the semiconductor device, and configured to isolate the data selected by the multiplexer from the internal circuitry during a transition process from the unlock mode to the lock mode.

Another aspect of the above embodiment provides that the interconnect circuitry further includes a clock alignment block configured to generate the local clock signal based on the source clock signal received from the interconnect. The local clock signal is not aligned with the source clock signal during the unlock mode of operation, and the local clock signal is aligned with the source clock signal during the lock mode of operation.

Another aspect of the above embodiment provides that the interconnect circuitry further includes a level shifter coupled to the interconnect, having an output coupled to the input of the first FF, and configured to shift a voltage level of the received source clock signal and the data received from the interconnect.

Another aspect of the above embodiment provides that the locking control logic is further configured to generate the mode control signal that indicates the unlock mode of operation in response to a startup process of the semiconductor device, generate an isolation control signal in response to a stall acknowledge signal received from the host semiconductor device, and generate the mode control signal that indicates the lock mode of operation after the stall acknowledge signal is cleared.

Another aspect of the above embodiment provides that the local clock signal includes a clock frequency equal to or greater than 400 Mhz during the lock mode of operation, and the local clock signal includes a clock frequency below 400 Mhz during the unlock mode of operation.

In another embodiment of the present disclosure, a semiconductor device is provided that includes locking control logic implemented on a physical interface of the semiconductor device, wherein the locking control logic is configured to generate a mode control signal that indicates one of an unlock mode of operation and a lock mode of operation of the semiconductor device. The semiconductor device also includes interconnect circuitry implemented on the physical interface, wherein the interconnect circuitry includes clock generation circuitry coupled to an interconnect and configured to receive a first local clock signal that is generated on the semiconductor device based on a first source clock signal that is received from a host semiconductor device via the interconnect, and output a physical interface (PHY) clock signal based on the first local clock signal. The PHY clock signal includes the first local clock signal during the lock mode of operation, and the PHY clock signal includes an inverted version of the first local clock signal during an unlock mode of operation. The semiconductor device also includes a first hold flip flop (FF) having an input coupled to the interconnect to receive first data associated with a first data signal, having a clock input coupled to the PHY clock signal, and configured to latch the first data at a positive edge of the PHY clock signal; and a second hold FF having an input coupled to the interconnect to receive second data associated with a second data signal, having a clock input coupled to the PHY clock signal, and configured to latch the second data at the positive edge of the PHY clock signal. The first hold FF and the second hold FF are configured to respectively latch the first data and the second data on sequential positive edges of the PHY clock signal during the unlock mode of operation and the lock mode of operation.

Another aspect of the above embodiment provides that the interconnect circuitry further includes a first FF having an input coupled to an output of the first hold FF to receive the first data from the first hold FF, having a clock input coupled to a second local clock signal, and configured to latch the first data on a positive edge of the second local clock signal. The second local clock signal is generated on the semiconductor device based on a second source clock signal that is received from the host semiconductor device via the interconnect, and the first local clock signal is faster than the second local clock signal. The interconnect circuitry further includes a second FF having an input coupled to an output of the second hold FF to receive the second data from the second hold FF, having a clock input coupled to the second local clock signal, and configured to latch the second data on the positive edge of the second local clock signal.

A further aspect of the above embodiment provides that the interconnect circuitry further includes a multiplexer having a first input coupled to the output of the second FF hold, having a second input coupled to an output of the second FF, and the multiplexer configured to select the first input during the lock mode of operation, and select the second input during the unlock mode of operation.

A further aspect of the above embodiment provides that the interconnect circuitry further includes a first isolation circuit having an input coupled to an output of the first FF, having an output coupled to internal circuitry of the semiconductor device, and configured to isolate the first data from the internal circuitry during a transition process from the unlock mode to the lock mode; and a second isolation circuit having an input coupled to an output of the multiplexer, having an output coupled to internal circuitry of the semiconductor device, and configured to isolate the data selected by the multiplexer from the internal circuitry during the transition process.

Another aspect of the above embodiment provides that the interconnect circuitry further includes a clock alignment block configured to generate the first local clock signal based on the first source clock signal received from the interconnect. The first local clock signal is not aligned with the source clock signal during the unlock mode of operation, and the first local clock signal is aligned with the source clock signal during the lock mode of operation.

Another aspect of the above embodiment provides that the interconnect circuitry further includes a level shifter coupled to the interconnect, having an output coupled to the input of the first hold FF and to the input of the second hold FF, and configured to shift a voltage level of the first source clock signal, the first data, and the second data received from the interconnect.

Another aspect of the above embodiment provides that the locking control logic is further configured to generate the mode control signal that indicates the unlock mode of operation in response to a startup process of the semiconductor device, generate a isolation control signal in response to a stall acknowledge signal received from the host semiconductor device, and generate the mode control signal that indicates the lock mode of operation after the stall acknowledge signal is cleared.

Another aspect of the above embodiment provides that the first local clock signal includes a clock frequency equal to or greater than 400 Mhz during the lock mode of operation, and the first local clock signal includes a clock frequency below 400 Mhz during the unlock mode of operation.

In another embodiment of the present disclosure, a method is provided that includes receiving a source clock signal from a primary semiconductor device, where the source clock signal is received by a secondary semiconductor device via an interconnect coupling the primary and secondary semiconductor devices; generating a local clock signal on the secondary semiconductor device based on the source clock signal; generating a mode control signal on the secondary semiconductor device, where the mode control signal indicates one of an unlock mode of operation and a lock mode of operation of the secondary semiconductor device; generating a physical interface (PHY) clock signal based on the local clock signal, where the PHY clock signal includes the local clock signal during the lock mode of operation, and the PHY clock signal includes an inverted version of the local clock signal during the unlock mode of operation; and latching data received from the primary semiconductor device via the interconnect, where the latching is performed at a positive edge of the PHY clock signal during the unlock mode of operation and the lock mode of operation.

Another aspect of the above embodiment provides that the method further includes latching second data received from the primary semiconductor device via the interconnect, where the latching second data is performed on a sequential positive edge of the PHY clock signal during the unlock mode of operation and the lock mode of operation.

Another aspect of the above embodiment provides that the method further includes generating the mode control signal that indicates the unlock mode of operation in response to a startup process of the secondary semiconductor device; and generating a transition control signal on the secondary semiconductor device in response to stall communication with the primary semiconductor device. The stall communication is initiated by the primary semiconductor device in response to detecting that a phase-locked loop circuit of the primary semiconductor device is locked, and the transition control signal is configured to stall the latching data.

Another aspect of the above embodiment provides that the method further includes generating the mode control signal that indicates the lock mode of operation in response to lock communication with the primary semiconductor device. The lock communication is initiated by the primary semiconductor device in response to an oscillator of the primary semiconductor device reaching a minimum clock frequency, and the local clock signal is aligned with the source clock signal during the lock mode of operation.

The circuitry described herein may be implemented on a semiconductor substrate, which can be any semiconductor material or combinations of materials, such as gallium arsenide, silicon germanium, silicon-on-insulator (SOI), silicon, monocrystalline silicon, the like, and combinations of the above.

As used herein, the term "bus" is used to refer to a plurality of signals or conductors which may be used to transfer one or more various types of information, such as data, addresses, control, or status. The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

The terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Each signal described herein may be designed as positive or negative logic, where negative logic can be indicated by a bar over the signal name. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Brackets are used herein to indicate the conductors of a bus or the bit locations of a value. For example, "bus 60

[7:0]" or "conductors [7:0] of bus 60" indicates the eight lower order conductors of bus 60, and "address bits [7:0]" or "ADDRESS [7:0]" indicates the eight lower order bits of an address value. The symbol "$" preceding a number indicates that the number is represented in its hexadecimal or base sixteen form. The symbol "%" preceding a number indicates that the number is represented in its binary or base two form.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Although the invention has been described with respect to specific conductivity types or polarity of potentials, skilled artisans appreciated that conductivity types and polarities of potentials may be reversed.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

As used herein the terms "substantial" and "substantially" mean sufficient to accomplish the stated purpose in a practical manner and that minor imperfections, if any, are not significant for the stated purpose.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A semiconductor device comprising:
    locking control logic implemented on a physical interface of the semiconductor device, wherein the locking control logic is configured to
        generate a mode control signal that indicates one of an unlock mode of operation and a lock mode of operation of the semiconductor device; and
    interconnect circuitry implemented on the physical interface, wherein the interconnect circuitry comprises:
        clock generation circuitry coupled to an interconnect and configured to
            receive a local clock signal that is generated on the semiconductor device based on a source clock signal that is received from a host semiconductor device via the interconnect, and
            output a physical interface (PHY) clock signal based on the local clock signal, wherein
                the PHY clock signal comprises the local clock signal during the lock mode of operation, and
                the PHY clock signal comprises an inverted version of the local clock signal during the unlock mode of operation, and
        a first flip flop (FF) having an input coupled to the interconnect to receive data from the interconnect, having a clock input coupled to the PHY clock signal, and configured to latch the data at a positive edge of the PHY clock signal during the unlock mode of operation and the lock mode of operation.

2. The semiconductor device of claim 1, wherein the interconnect circuitry further comprises:
    a second FF having a clock input configured to receive the local clock signal, having an input coupled to an output of the first FF to receive the data from the first FF, and configured to latch the data on the positive edge of the local clock signal during the unlock mode of operation and the lock mode of operation.

3. The semiconductor device of claim 2, wherein the interconnect circuitry further comprises:
    a multiplexer having a first input coupled to the output of the first FF, having a second input coupled to an output of the second FF, and configured to
        select the first input during the lock mode of operation, and
        select the second input during the unlock mode of operation.

4. The semiconductor device of claim 3, wherein the interconnect circuitry further comprises:
    an isolation circuit having an input coupled to the output of the multiplexer, having an output coupled to internal circuitry of the semiconductor device, and configured to isolate the data selected by the multiplexer from the internal circuitry during a transition process from the unlock mode to the lock mode.

5. The semiconductor device of claim 1, wherein the interconnect circuitry further comprises:
    a clock alignment block configured to
        generate the local clock signal based on the source clock signal received from the interconnect, wherein
            the local clock signal is not aligned with the source clock signal during the unlock mode of operation, and
            the local clock signal is aligned with the source clock signal during the lock mode of operation.

6. The semiconductor device of claim 1, wherein the interconnect circuitry further comprises:
    a level shifter coupled to the interconnect, having an output coupled to the input of the first FF, and configured to shift a voltage level of the received source clock signal and the data received from the interconnect.

7. The semiconductor device of claim 1, wherein
the locking control logic is further configured to
generate the mode control signal that indicates the unlock mode of operation in response to a startup process of the semiconductor device,
generate an isolation control signal in response to a stall acknowledge signal received from the host semiconductor device, and
generate the mode control signal that indicates the lock mode of operation after the stall acknowledge signal is cleared.

8. The semiconductor device of claim 1, wherein
the local clock signal comprises a clock frequency equal to or greater than 400 Mhz during the lock mode of operation, and
the local clock signal comprises a clock frequency below 400 Mhz during the unlock mode of operation.

9. A semiconductor device comprising:
locking control logic implemented on a physical interface of the semiconductor device, wherein the locking control logic is configured to
generate a mode control signal that indicates one of an unlock mode of operation and a lock mode of operation of the semiconductor device; and
interconnect circuitry implemented on the physical interface, wherein the interconnect circuitry comprises:
clock generation circuitry coupled to an interconnect and configured to
receive a first local clock signal that is generated on the semiconductor device based on a first source clock signal that is received from a host semiconductor device via the interconnect, and
output a physical interface (PHY) clock signal based on the first local clock signal, wherein
the PHY clock signal comprises the first local clock signal during the lock mode of operation, and
the PHY clock signal comprises an inverted version of the first local clock signal during an unlock mode of operation;
a first hold flip flop (FF) having an input coupled to the interconnect to receive first data associated with a first data signal, having a clock input coupled to the PHY clock signal, and configured to latch the first data at a positive edge of the PHY clock signal; and
a second hold FF having an input coupled to the interconnect to receive second data associated with a second data signal, having a clock input coupled to the PHY clock signal, and configured to latch the second data at the positive edge of the PHY clock signal, wherein
the first hold FF and the second hold FF are configured to respectively latch the first data and the second data on sequential positive edges of the PHY clock signal during the unlock mode of operation and the lock mode of operation.

10. The semiconductor device of claim 9, wherein the interconnect circuitry further comprises:
a first FF having an input coupled to an output of the first hold FF to receive the first data from the first hold FF, having a clock input coupled to a second local clock signal, and configured to latch the first data on a positive edge of the second local clock signal, wherein the second local clock signal is generated on the semiconductor device based on a second source clock signal that is received from the host semiconductor device via the interconnect, and
the first local clock signal is faster than the second local clock signal; and
a second FF having an input coupled to an output of the second hold FF to receive the second data from the second hold FF, having a clock input coupled to the second local clock signal, and configured to latch the second data on the positive edge of the second local clock signal.

11. The semiconductor device of claim 10, wherein the interconnect circuitry further comprises:
a multiplexer having a first input coupled to the output of the second FF hold, having a second input coupled to an output of the second FF, and the multiplexer configured to
select the first input during the lock mode of operation, and
select the second input during the unlock mode of operation.

12. The semiconductor device of claim 11, wherein the interconnect circuitry further comprises:
a first isolation circuit having an input coupled to an output of the first FF, having an output coupled to internal circuitry of the semiconductor device, and configured to isolate the first data from the internal circuitry during a transition process from the unlock mode to the lock mode; and
a second isolation circuit having an input coupled to an output of the multiplexer, having an output coupled to internal circuitry of the semiconductor device, and configured to isolate the data selected by the multiplexer from the internal circuitry during the transition process.

13. The semiconductor device of claim 9, wherein the interconnect circuitry further comprises:
a clock alignment block configured to
generate the first local clock signal based on the first source clock signal received from the interconnect, wherein
the first local clock signal is not aligned with the source clock signal during the unlock mode of operation, and
the first local clock signal is aligned with the source clock signal during the lock mode of operation.

14. The semiconductor device of claim 9, wherein the interconnect circuitry further comprises:
a level shifter coupled to the interconnect, having an output coupled to the input of the first hold FF and to the input of the second hold FF, and configured to shift a voltage level of the first source clock signal, the first data, and the second data received from the interconnect.

15. The semiconductor device of claim 9, wherein
the locking control logic is further configured to
generate the mode control signal that indicates the unlock mode of operation in response to a startup process of the semiconductor device,
generate a isolation control signal in response to a stall acknowledge signal received from the host semiconductor device, and
generate the mode control signal that indicates the lock mode of operation after the stall acknowledge signal is cleared.

16. The semiconductor device of claim 9, wherein
the first local clock signal comprises a clock frequency equal to or greater than 400 Mhz during the lock mode of operation, and the first local clock signal comprises a clock frequency below 400 Mhz during the unlock mode of operation.

17. A method comprising:

receiving a source clock signal from a primary semiconductor device, wherein
the source clock signal is received by a secondary semiconductor device via an interconnect coupling the primary and secondary semiconductor devices;

generating a local clock signal on the secondary semiconductor device based on the source clock signal;

generating a mode control signal on the secondary semiconductor device, wherein
the mode control signal indicates one of an unlock mode of operation and a lock mode of operation of the secondary semiconductor device;

generating a physical interface (PHY) clock signal based on the local clock signal,
wherein
the PHY clock signal comprises the local clock signal during the lock mode of operation, and
the PHY clock signal comprises an inverted version of the local clock signal during the unlock mode of operation; and latching data received from the primary semiconductor device via the interconnect,
wherein
the latching is performed at a positive edge of the PHY clock signal during the unlock mode of operation and the lock mode of operation.

18. The method of claim 17, further comprising:

latching second data received from the primary semiconductor device via the interconnect, wherein
the latching second data is performed on a sequential positive edge of the PHY clock signal during the unlock mode of operation and the lock mode of operation.

19. The method of claim 17, further comprising:

generating the mode control signal that indicates the unlock mode of operation in response to a startup process of the secondary semiconductor device; and generating a transition control signal on the secondary semiconductor device in response to stall communication with the primary semiconductor device, wherein
the stall communication is initiated by the primary semiconductor device in response to detecting that a phase-locked loop circuit of the primary semiconductor device is locked, and
the transition control signal is configured to stall the latching data.

20. The method of claim 17, further comprising:

generating the mode control signal that indicates the lock mode of operation in response to lock communication with the primary semiconductor device, wherein
the lock communication is initiated by the primary semiconductor device in response to an oscillator of the primary semiconductor device reaching a minimum clock frequency, and
the local clock signal is aligned with the source clock signal during the lock mode of operation.

* * * * *